US008632729B2

(12) United States Patent
Inoue et al.

(10) Patent No.: US 8,632,729 B2
(45) Date of Patent: Jan. 21, 2014

(54) FIXED BED MIXED GAS/LIQUID PHASE REACTOR AND MIXED GAS/LIQUID PHASE REACTION PROCESS USING THE SAME

(75) Inventors: Tomoya Inoue, Miyagi (JP); Tomio Kato, Tokyo (JP); Kenji Kato, Tokyo (JP)

(73) Assignees: National Institute of Advanced Industrial Scienec and Technology, Tokyo (JP); Mitsubishi Gas Chemical Company, Inc., Tokyo (JP)

( * ) Notice: Subject to any disclaimer, the term of this patent is extended or adjusted under 35 U.S.C. 154(b) by 263 days.

(21) Appl. No.: 13/124,228

(22) PCT Filed: Oct. 15, 2009

(86) PCT No.: PCT/JP2009/005399
§ 371 (c)(1),
(2), (4) Date: Apr. 14, 2011

(87) PCT Pub. No.: WO2010/044271
PCT Pub. Date: Apr. 22, 2010

(65) Prior Publication Data
US 2011/0200519 A1 Aug. 18, 2011

(30) Foreign Application Priority Data

Oct. 15, 2008 (JP) ................................. 2008-266839
May 29, 2009 (JP) ................................. 2009-131470

(51) Int. Cl.
*B01J 8/02* (2006.01)
*B01J 35/02* (2006.01)
(52) U.S. Cl.
USPC ........... 422/211; 422/212; 422/187; 422/311; 422/603; 423/584
(58) Field of Classification Search
USPC .................... 423/584; 422/211, 212
See application file for complete search history.

(56) References Cited

U.S. PATENT DOCUMENTS 6,713,036 B1 3/2004 Vanden Bussche et al.
7,029,647 B2 4/2006 Tonkovich et al.
(Continued)

FOREIGN PATENT DOCUMENTS

JP 2002-292275 10/2002
JP 2006-52352 2/2006
(Continued)

OTHER PUBLICATIONS

Patent Abstract of Japan 2002-292275 Published Oct. 8, 2002.
(Continued)

*Primary Examiner* — Melvin C Mayes
*Assistant Examiner* — Melissa Stalder
(74) *Attorney, Agent, or Firm* — Ladas & Parry LLP

(57) ABSTRACT

The present invention provides a fixed bed reactor for carrying out a mixed gas/liquid phase reaction, wherein the reactor has a piping structure composed of microchannels, the cross-sectional area of the fixed bed is 0.0001 $cm^2$ to 0.008 $cm^2$ and a single or parallely arranged two or more fixed beds, and the reactor has, in addition to the fixed beds, a gas phase distribution portion, a portion for introducing the gas phase to the fixed bed, a liquid phase distribution portion, a portion for introducing the liquid phase to the fixed bed, a packing material introduction portion and a fluid merging portion, a gas/liquid mixed phase reaction process for carrying out a gas/liquid mixed phase reaction using the fixed bed reactor described above, and further a process for producing hydrogen peroxide in which the reaction is started and stopped in a reducing atmosphere, and the present invention further provides a novel fixed bed gas/liquid mixed phase reactor which makes it possible to carry out gas/liquid mixed phase reactions stably and under steady state conditions by using microchannels.

28 Claims, 3 Drawing Sheets

(56) References Cited

U.S. PATENT DOCUMENTS

| | | |
|---|---|---|
| 7,115,192 B1 | 10/2006 | Vanden Bussche et al. |
| 7,192,562 B1 | 3/2007 | Towler |
| 7,195,747 B2 | 3/2007 | Vanden Bussche et al. |
| 2005/0163701 A1 | 7/2005 | Tonkovich et al. |
| 2005/0265915 A1 | 12/2005 | Tonkovich et al. |
| 2006/0233695 A1 | 10/2006 | Lawal et al. |
| 2007/0053808 A1 | 3/2007 | Markowz |
| 2007/0246106 A1 | 10/2007 | Tonkovich et al. |

FOREIGN PATENT DOCUMENTS

| | | |
|---|---|---|
| JP | 2006-248972 | 9/2006 |
| JP | 2006/523522 A | 10/2006 |
| JP | 2007-519601 | 7/2007 |
| JP | 2007-230908 | 9/2007 |
| JP | 2009-500165 | 1/2009 |
| WO | 03/106386 A2 | 12/2003 |
| WO | 2004/091771 A1 | 10/2004 |
| WO | 2005/075349 A1 | 8/2005 |
| WO | 2007/008495 A2 | 1/2007 |
| WO | 2007/027767 A2 | 3/2007 |

OTHER PUBLICATIONS

Patent Abstract of Japan 2006-248972 Published Sep. 21, 2006.
Patent Abstract of Japan 2006-52352 Published Feb. 23, 2006.
Machine English translation of Japan 2006-52352 Published Feb. 23, 2006.
Machine English translation of Japan 2007-519601 Published Feb. 23, 2006.
Machine English translation of Japan 2009-500165 Published Jan. 8, 2009.
Volker Hessel, Steffen Hardt and Holger Loewe co-authors, "Chemical Micro Process Engineering-Fundamentals, Modeling and Reactions", 2004, publisher: Wiley-VCH Verlag GmbH & Co., KGaA, Weinhelm (ISBN: 3-527-30741-9).
Jose M. Campos-Martin et al., "Hydrogen Peroxide Synthesis: An Outlook Beyond the Anthraquinone Process", Angewandte Chemie International Edition, vol. 45, 6962-6984 (2006).
Tomoya Inoue et al., "Microfabricated Multiphase Reactors for the Direct Synthesis of Hydrogen Peroxide from Hydrogen and Oxygen", Industrial and Engineering Chemistry Research, vol. 46, 1153-1160 (2007).
Yasuhiro Wada et al., "Flow Distribution and Ozonolysis in Gas-Liquid Multichannel Microrcactors", Industrial and Engineering Chemistry Research, vol. 45, 8036-8042 (2006).
International Preliminary Report on Patentability dated May 26, 2011 for Application No. PCT/JP2009/005399.
Supplementary European Search Report dated Mar. 7, 2012 for Application No. 09820449.8-2104.
Singapore Written Opinion dated Dec. 6, 2012 for Singapore Application No. 201102646-5.

FIXED BED MIXED GAS/LIQUID PHASE REACTOR AND MIXED GAS/LIQUID PHASE REACTION PROCESS USING THE SAME

TECHNICAL FIELD

The present invention relates to a fixed bed reactor for carrying out gas/liquid mixed phase reactions and a gas/liquid mixed phase reaction process, and more particularly, relates to a fixed bed gas/liquid mixed phase reactor having a piping structure composed of microchannels that is capable of increasing the efficiency of mass transfer from gas phase to liquid phase by 10-fold to 100-fold in comparison with conventional reactors by improving the structure of gas/liquid introduction portions, and a mixed gas/liquid phase reaction process that uses the same. The present invention provides a novel technology and novel product relating to a fixed bed mixed gas/liquid reactor and a mixed gas/liquid phase reaction process thereof which make it possible to, for example, safely produce hydrogen peroxide under constant conditions and with high efficiency while saving energy and placing little burden on the environment in a direct reaction process, using a mixed gas of hydrogen and oxygen.

BACKGROUND ART

In recent years, the development of continuous reaction processes has aggressively proceeded using microchannels composed of microtubes having a cross-sectional area of about 0.01 $cm^2$ or less. This technology is characterized by improving reaction controllability by improving the efficiency of heat removal by taking advantage of the high specific surface area of these microchannels, and improving reaction efficiency by increasing the efficiency of mass transfer.

Known examples of being able to significantly improve reaction controllability in a continuous reaction process include a direct fluorination reaction using fluorine for the gas phase, and using microchannels to efficiently control reactions between hydrogen and oxygen (Non-Patent Document 1).

With respect to reactions within a microreactor composed of microchannels, an increase in the interface area within the microchannels promotes mass transfer and improves reaction efficiency, while an increase in specific surface area of the reactor facilitates temperature control, and these reactions are characterized by being able to achieve reaction conditions and reaction selectivity unable to be achieved with conventional reactors. Consequently, the prior art consists nearly entirely of proposals relating to microreactors, or the shape and size of microchannels, while there have been few disclosures regarding optimum reaction conditions or catalyst usage environment in these reactors.

A production process of epoxy compounds characterized by epoxidating olefin compounds from hydrogen peroxide has been proposed as an example of a production process carried out in a microreactor using a catalyst (Patent Document 1). In this document as well, there are no particular limitations on the oxidation catalyst used and a known oxidation catalyst can be used, and there are also no particular limitations on the liquid distributing method used when supplying the mixture of olefin compound and hydrogen peroxide to the microreactor, and a known method can also be employed. However, the catalyst particle diameter disclosed in the examples is 1 micron or less, and considerable pressure loss is predicted to occur within the microreactor. It is clear that special considerations are required to be given to the liquid distribution method from the viewpoint of stable operation of the reaction.

A process for carrying out hydrogenation of aldehyde compounds or nitro compounds under mild conditions by catalytic hydrogenation is proposed as an example of a production process carried out in a microreactor using a catalyst (Patent Document 2). In this document, although the examples of hydrogenation catalysts used in the microreactor include a palladium catalyst, nickel catalyst, platinum catalyst and ruthenium catalyst, the mean particle diameter of the hydrogenation catalyst is normally preferably about 0.1 to 100 µm and particularly preferably about 1 to 50 µm, and the ratio of catalyst mean particle diameter to flow path diameter is preferably about 0.1 or less and particularly preferably about 0.07 or less, there is no disclosure regarding the hydrogen flow rate and efficacy of the use of hydrogen is an issue from the viewpoint of reaction efficiency.

A technology has been proposed for producing water and at least one type of alkene and/or aralkene by allowing a hydrocarbon-containing fluid containing an alkane or aralkane and an oxygen source into microchannels having a catalyst therein and by allowing the hydrocarbon-containing fluid and the oxygen source to react within the microchannels within a temperature range of 300 to 1000° C. (Patent Document 3). In this document as well, there are no particular limitations on the catalyst active substance used, and any conventional effective oxidative dehydrogenation catalyst can be contained, while there is no particular disclosure relating to the catalyst usage environment for enhancing, reaction efficiency. In addition, the target reaction of this technology is a gas phase reaction, and it is not clear whether this technology can be applied as it is to a mixed gas/liquid phase reaction.

Next, reactions of hydrogen and oxygen are expected to be applied to a hydrogen peroxide production process. In the past, hydrogen peroxide has been produced by a reaction process referred to as the anthraquinone process. In this production process, however, the anthraquinone successively decomposes during the operation of the process, and has been indicated as having problems such as the formation of impurities resulting from decomposition products thereof contaminating the hydrogen peroxide as the final product, and as a result thereof, studies have been conducted for many years for replacing this process with a direct reaction process using hydrogen and oxygen that does not result in the formation of impurities.

At present, the use of microreactor technology to a hydrogenation step to impart higher productivity than a conventional hydrogenation reactor based on the anthraquinone process has been disclosed as an example of a commercially implemented hydrogen peroxide production process (Patent Document 4). In this document as well, the catalyst used in the hydrogenation reactor is indicated having any size or geometrical shape that is compatible for the use within microchannels, and the hydrogenation catalyst may be alternatively filled into the microreactor channels or deposited, dispersed or coated onto a conventional catalyst support introduced therein. In this document as well, there is no particular disclosure relating to the catalyst usage environment for enhancing reaction efficiency. In addition, the present technology does not solve the basic problems of anthraquinone process of successive decomposition of the anthraquinone and resulting contamination of the hydrogen peroxide as the final product.

In the production of hydrogen peroxide by a direct reaction process using hydrogen and oxygen, studies have been previously conducted on a reaction system composed of an aqueous solution containing a trace amount of a stabilizer for stably recovering hydrogen peroxide and a catalyst composed mainly of a precious metal such as palladium or gold. More specifically, hydrogen peroxide is formed by allowing hydrogen and oxygen dissolved in water to react on a catalyst (Non-Patent Document 2).

This direct reaction process has several problems from the viewpoint of safety and productivity when attempting to make it industrially available. First, since the hydrogen and oxygen form an explosive mixed gas over an extremely wide range, it was necessary to operate under conditions in which hydrogen partial pressure was reduced to 4% or less in the prior art. In addition, since hydrogen peroxide is formed by reaction of hydrogen and oxygen dissolved in water, it was necessary to improve the dissolution efficiency of each component.

In order to solve the problems of this direct reaction process, a continuous process technology using microchannels is considered to be effective. For example, the inventors of the present invention developed a microreactor by fabricating microchannels on silicon, and constructed a microreactor in which a supported palladium catalyst was filled into the microchannels of the microreactor.

This microreactor was effective for producing hydrogen peroxide both safely and stably despite operating under explosive conditions in which the hydrogen content is 20 to 50% when producing hydrogen peroxide from a mixed gas of hydrogen and oxygen. In addition, quantitative evaluation of mass transfer from the gas phase to the liquid phase revealed that mass transfer is 10 to 100 times more efficient than conventional reactors.

The reason why an explosive composition of a mixed gas of hydrogen and oxygen can be handled safely by this microreactor is that propagation of the explosion is prevented by the use of microchannels, and improvement of efficiency of mass transfer is thought to be the result of having increased the contact interface between gas and liquid due to filling the microchannels with a catalyst having a small particle diameter.

However, the concentration of the resulting hydrogen peroxide was held to a low value of 0.2% by weight, this was considered to be caused by a problem with introducing the gas and liquid phases into the microreactor based on the results of experiments consisting of visualizing gas flow (Non-Patent Document 3).

On the other hand, Van den Bussche et al. have disclosed a process for producing hydrogen peroxide following the production of hydrogen and oxygen by electrolysis with respect to a hydrogen peroxide production process based on microchannels (Patent Documents 5 to 8). However, both the details of the reactor and the concentration of hydrogen peroxide are unclear.

In addition, Tonkovich et al. have provided a detailed disclosure of a reactor structure with respect to a hydrogen peroxide production process (Patent Document 9). However, this document does not contain a detailed disclosure of the reaction conditions, and the performance of the reactor is completely unclear.

Moreover, Lawal et al. have proposed a reactor in which a palladium-supported catalyst is filled into SUS pipes having an inner diameter of 775 μm, and disclosed the synthesis of hydrogen peroxide having a maximum concentration of 1.1% by weight (Patent Document 10). However, in this reactor, a large excess gas of hydrogen and oxygen are required to flow through the reactor in order to form a stable flow of the mixed gas/liquid phase, thereby resulting in the problem of having to recycle the gases unreacted.

Now, in developing a continuous reactor that uses microchannels, it is essential to arrange several to more than ten rows of microchannels in parallel, for example, in order to ensure a required production volume while ensuring high reaction controllability. In this case, in order to realize productivity as expected, it is necessary to make the reaction conditions uniform for each microchannel.

For example, in the hydrogen peroxide production process developed by the inventors of the present invention (Non-Patent Document 3), although ten rows of microchannels are arranged in parallel, variations in the flow of the mixed gas/liquid phase to each microchannel were observed by visually analyzing the flow. This was thought to be the reason for the loss of productivity in the hydrogen peroxide production process disclosed in Non-Patent Document 3.

On the other hand, Kitamori et al. have disclosed a parallel arrangement method by laminating glass reactors (Patent Document 11). However, while to this method is limited to liquid phase reactions, it also has the problems, with increasing the degree of parallel operation of an increase in the possibility of different flow rates of the reaction solution for each microchannel due to drift which causes a decrease in the productivity of the reactor.

In addition, Tonkovich et al. have developed a reactor in which microchannels are arranged in parallel, and have shown that a fluid can be evenly distributed to each microchannel (Patent Document 12). However, this document only discloses the case of distributing the flow of a single type of fluid for this reactor, and whether or not it can be applied to a mixed gas/liquid phase reaction as in the case of producing hydrogen peroxide is not clear.

Moreover, Wada et al. have developed a reactor for carrying out an ozone oxidation reaction in which 16 microchannels are arranged in parallel, and have shown that in this reactor, post-shape structures are cumulatively fabricated within each microchannel using microfabrication technology, and that a mixed gas/liquid phase flow is formed with an improved mass transfer efficiency (Non-Patent Document 4). However, this reactor has problems from the viewpoint of integrating a catalyst within the microchannels when considering application to a solid catalyst reaction, and it is not clear whether or not an even gas-liquid mixed phase flow is formed among the 16 microchannels under conditions in which a catalyst has been integrated.

In this manner, in the case of technologies relating to conventional microreactors composed of microchannels, since it is difficult for the mixed gas/liquid phase reaction to accommodate industrial production, the development of a continuous reactor using microchannels that is able to accommodate industrial production and allow continuous reaction has been a strongly favored in the technical field.

Patent Document 1: Japanese Patent Application Laid-open No. 2007-230908
Patent Document 2: Japanese Patent Application Laid-open No. 2006-248972
Patent Document 3: PCT/US2003/016210 (WO/2003/106386)
Patent Document 4: PCT/US2006/033851 (WO/2007/027767)
Patent Document 5: U.S. Pat. No. 6,713,036
Patent Document 6: U.S. Pat. No. 7,115,192
Patent Document 7: U.S. Pat. No. 7,192,562
Patent Document 8: U.S. Pat. No. 7,195,747
Patent Document 9: U.S. Pat. No. 7,029,647
Patent Document 10: U.S. Patent Publication No. 2006/0233695A1

Patent Document 11: Japanese Patent Application Laid-open No. 2002-292275

Patent Document 12: U.S. Patent Publication No. 2007/0246106A1

Non-Patent Document 1: Volker Hessel, Steffen Hardt and Holger Loewe co-authors, "Chemical Micro Process Engineering-Fundamentals, Modeling and Reactions", 2004, publisher: Wiley-VCH Verlag GmbH & Co., KGaA, Weinhelm (ISBN: 3-527-30741-9)

Non-Patent Document 2: Jose M. Campos-Martin et al., "Hydrogen Peroxide Synthesis: An Outlook Beyond the Anthraquinone Process", Angewandte Chemie International Edition, Vol. 45, 6962-6984 (2006)

Non-Patent Document 3: Tomoya Inoue et al., "Microfabricated Multiphase Reactors for the Direct Synthesis of Hydrogen Peroxide from Hydrogen and Oxygen", Industrial and Engineering Chemistry Research, Vol. 46, 1153-1160 (2007)

Non-Patent Document 4: Yasuhiro Wada et al., "Flow Distribution and Ozonolysis in Gas-Liquid Multichannel Microreactors", Industrial and Engineering Chemistry Research, Vol. 45, 8036-8042 (2006)

DISCLOSURE OF THE INVENTION

With the foregoing in view, the inventors of the present invention conducted extensive studies on the problem of obtaining a hydrogen peroxide concentration near that of commercial hydrogen peroxide in a process for direct synthesis of hydrogen peroxide from hydrogen and oxygen without using an working solution as in the conventional anthraquinone process for the purpose of developing a continuous gas/liquid mixed phase reactor that uses microchannels capable of accommodating industrial production and allowing continuous reaction and gas/liquid mixed phase reaction process. As a result thereof, the inventors of the present invention found that:

1) a reactor that consists of pipings with certain cross-sectional area formed so as to satisfy certain conditions for cross-sectional area of a fixed bed, pressure drop of gas phase/liquid phase introduction piping, pressure drop when a liquid phase is allowed to flow into a fixed bed reactor, and in the case two or more fixed beds are arranged in parallel, a portion where the gas phase and liquid phase are distributed to each fixed bed and a portion where the flows from each fixed bed merge towards an outlet, and/or a packing material structure that promotes the formation of a mixed gas/liquid phase formed so as to satisfy the same conditions, is constructed, and that 2) reaction efficiency, more specifically hydrogen yield, is significantly improved and hydrogen peroxide concentration is increased when synthesizing hydrogen peroxide directly from hydrogen and oxygen by carrying out a reaction starting operation in a reducing atmosphere followed by carrying out a direct synthesis reaction of hydrogen peroxide in the presence of hydrogen and oxygen, and finally stopping the reaction in a reducing atmosphere, thereby leading to the completion of the present invention.

Namely, the present invention significantly improves controllability of a gas/liquid mixed phase reaction in a fixed bed reactor composed of microchannels enabling a gas/liquid mixed phase reaction to be carried out in which mass transfer from the gas phase to the liquid phase is 10 to 100 times more efficient than a conventional reactor.

In addition, an object of the present invention is to provide a fixed bed gas/liquid mixed phase reactor and mixed gas/liquid phase reaction process capable of improving productivity while maintaining the characteristics of carrying out the reaction by microchannels by arranging in parallel fixed bed reactors having microchannels capable of carrying out a gas/liquid mixed phase reaction at 10-100 times higher mass transfer rate from gas phase to liquid phase than a conventional reactor.

Moreover, an object of the present invention is to provide a fixed bed reactor composed of microchannels capable of carrying out a mixed gas/liquid phase reaction at 10-100 times higher mass transfer rate from gas phase to liquid phase than a conventional reactor, wherein during the direct synthesis of hydrogen peroxide from hydrogen and oxygen, catalyst life is remarkably improved by starting and stopping the reaction both carried out in a reducing atmosphere.

An object of the present invention is to provide a fixed bed reactor allowing the obtaining of hydrogen peroxide of 1% by weight or more constantly while improving productivity by, for example, arranging microchannels in parallel in contrast to a conventional microreactor allowing the concentration of hydrogen peroxide obtained to be held at a low value of 0.2% by weight. Moreover, an object of the present invention is to provide a fixed bed mixed gas/liquid phase reactor with microchannels in which specific gas phase introduction portions and a liquid phase introduction portion are formed that enable an explosive composition of hydrogen and oxygen gas mixture to be handled safely, and a gas/liquid mixed phase reaction process.

In order to solve the above-mentioned problems, the present invention is a fixed bed reactor for carrying out a mixed gas/liquid phase reaction, wherein the reactor has a piping structure composed of microchannels, with a cross-sectional area of a fixed bed being 0.0001 cm$^2$ to 0.008 cm$^2$, a fixed bed portion, a gas phase introduction portion and a liquid phase introduction portion, and when $\Delta P_g$ represents the pressure drop of piping of the gas phase introduction portion when the gas phase has passed therethrough and $\Delta P_l$ represents the pressure drop when the liquid phase has passed through the fixed bed reactor via the liquid phase introduction portion, the reactor has a piping thickness structure formed so as to satisfy the condition $\Delta P_g > 5\Delta P_l$ under mixed gas/liquid phase reaction conditions and/or a packing material structure that promotes formation of a mixed gas/liquid phase formed so as to satisfy the same conditions.

In addition, the present invention is a fixed bed reactor having a piping structure composed of microchannels for carrying out a gas/liquid mixed phase reaction, wherein the reactor has two or more parallel fixed beds having a cross-sectional area of 0.0001 cm$^2$ to 0.008 cm$^2$, and the reactor has, in addition to the fixed beds, a gas phase distribution portion, a portion for introducing the gas phase to the fixed bed, a liquid phase distribution portion, a portion for introducing the liquid phase to the fixed bed, and a packing (packed) material introduction portion and a fluid merging portion, and when $\Delta P_{g-d}$ and $\Delta P_{g-i}$ represent respectively the pressure drop of the piping of the gas phase distribution portion and the gas phase introduction portion, $\Delta P_{l-d}$ and $\Delta P_{l-x}$ represent respectively pressure losses of the piping of the liquid phase distribution portion and the liquid phase introduction portion, $\Delta P_{l-p}$ represents the pressure drop of the fixed bed portion of the pressure drops when the liquid phase has passed through the parallel arranged fixed beds, and $\Delta P_o$ represents the pressure loss when the liquid phase has passed through the fluid merging portion at the end of the fixed bed, all of the following conditions 1) to 4) are satisfied:

1) a ratio of the cross-sectional area of the gas phase introduction portion to the cross-sectional area of the fixed bed is within a range of 0.0001 to 0.05, and a ratio of the cross-sectional area of the liquid phase introduction portion to the cross-sectional area of the fixed bed is within a range of 0.0003 to 0.3;

2) $\Delta P_{l-i} > 10\Delta P_{l-d}$ and $\Delta P_{g-i} > 10\Delta P_{g-d}$;
3) $\Delta P_{l-p} > 2.5\Delta P_o$, and
4) $\Delta P_{g-i} > 5\Delta P_{l-p}$, and the reactor has a packing material structure in which each liquid phase is evenly distributed in the two or more parallel fixed beds.

Moreover, the present invention is a process for carrying out a gas/liquid mixed phase reaction using the fixed bed reactor mentioned above 8, wherein a mixed gas/liquid phase reaction is carried out by operating the fixed bed reactor under conditions such that a superficial velocity of the gas phase is 0.01 m/s to 10 m/s and a superficial velocity of the liquid phase is $10^{-5}$ m/s to $10^{-2}$ m/s in a single microchannel or two or more microchannels arranged in parallel.

Next, a detailed explanation is provided of the first aspect of the present invention.

The present invention is a fixed bed reactor for carrying out a gas/liquid mixed phase reaction, wherein the reactor has a piping structure composed of microchannels, a cross-sectional area of a fixed bed is 0.0001 cm$^2$ to 0.008 cm$^2$, and the reactor has a fixed bed, a gas phase introduction portion and a liquid phase introduction portion, and when $\Delta P_g$ represents the pressure drop of piping of the gas phase introduction portion when the gas phase has passed therethrough and $\Delta P_l$ represents the pressure drop when the liquid phase has passed through the fixed bed reactor via the liquid phase introduction portion, the reactor has a combination of piping of certain cross-sectional areas so as to satisfy the condition $\Delta P_g > 5\Delta P_l$ under gas/liquid mixed phase reaction conditions and/or a packing material structure that promotes formation of a gas/liquid mixed phase formed so as to satisfy the same conditions.

In addition, the present invention is a gas/liquid mixed phase reaction process for carrying out a gas/liquid mixed phase reaction by using the above-mentioned fixed bed reactor, wherein the gas/liquid mixed phase reaction is carried out by operating the fixed bed reactor under conditions such that the superficial velocity of the gas phase is 0.01 m/s to 10 m/s and the superficial velocity of the liquid phase is $10^{-5}$ m/s to $10^{-2}$ m/s.

The present invention is characterized in that, in a fixed bed reactor having microchannels for carrying out a mixed gas/liquid phase reaction, when $\Delta P_g$ represents the pressure drop of a gas phase introduction portion when the gas phase has passed therethrough and $\Delta P_l$ represents the pressure drop when the liquid phase has passed through the fixed bed reactor, the structure of the fixed bed having a packing material, a gas phase introduction portion, and a liquid phase introduction portion employ a structure having a combination of piping of certain cross-sectional areas so as to satisfy the condition $\Delta P_g > 5\Delta P_l$ under a reaction condition and/or a packing material structure that promotes the formation of a gas/liquid mixed phase formed so as to satisfy the same condition.

The fixed bed reactor of the present invention has a configuration enabling an operation to be carried out which consists of supplying respectively a gas phase via a gas phase introduction portion and a liquid phase via a liquid phase introduction portion into the fixed bed composed of micro channels, contacting the gas phase with the liquid phase on the fixed bed micro channels followed by a gas/liquid mixed phase formation and a gas/liquid mixed phase reaction, and recovering a reaction product from an outlet of an outlet portion provided at the end of the fixed bed. The reactor may be fabricated by coupling piping that satisfies the requirement of $\Delta P_g > 5\Delta P_l$, may be fabricated as an integrated reactor in which microchannels that satisfy the requirement are formed by processing a material that is stable with respect to the reaction conditions in the manner of a metal plate, silicon plate or glass plate, or, as long as the flow regime of the gas/liquid mixed phase flow does not change, the portion in which the gas/liquid mixed phase flow is formed and the portion of the fixed bed where the actual reaction is carried out may be fabricated independently followed by functioning as integral components of the reactor.

In the present invention, when considering that the cross-sectional area of the fixed bed is 0.008 cm$^2$ or less and the cross-sectional areas of the gas phase or liquid phase introduction portion and discharge port of the discharge portion located in the periphery of the fixed bed are even smaller, the reactor can be fabricated by using micro electromechanical system (MEMS) technology to form grooves as in the fixed bed, gas phase introduction portion, liquid phase introduction portion, and discharge portion and the like on the surface of a material such as a metal plate, silicon plate or glass plate used as the material of the reactor and bonding the plates in which grooves have been formed to form microchannels of the fixed bed, gas phase introduction portion, liquid phase introduction portion and discharge portion and the like.

In this case, specific examples of techniques for forming grooves by MEMS technology include plasma etching, chemical etching and drilling. In addition, examples of techniques for bonding the plates in which grooves have been formed include thermal fusion and anodic bonding (in the case of bonding silicon and soda glass, for example).

From the viewpoints of maintaining a large specific surface area of the reaction pipe and taking advantage of the characteristic of using microchannels in the reaction, the cross-sectional surface area of the fixed bed is preferably 0.008 cm$^2$ or less, and from the viewpoint of packing the inside of the reaction pipe with a solid material, the fixed bed preferably has a cross-sectional area of 0.0001 cm$^2$ or more. Moreover, in consideration of the pressure drop, the cross-sectional area of the fixed bed portion is preferably 0.0008 to 0.008 cm$^2$.

The fixed bed, gas phase introduction portion and liquid phase introduction portion in the fixed bed reactor is arranged so as to locate the gas phase introduction portion and the liquid phase introduction portion being nearer the upstream of the microchannels of the gas phase and liquid phase to the fixed bed of the fixed bed reactor. In addition, the number of the gas phase introduction portion and liquid phase introduction portion is not limited to one for a fixed bed, but rather may be provided at several locations. The form of arrangement and specific configuration of the arranged locations of the fixed bed, gas phase introduction portion, liquid phase introduction portion and discharge portion can be arbitrarily set corresponding to the type of reaction and the purpose of use. In addition, the specific configuration of the shape and structure of the grooves corresponding to the fixed bed portion, gas phase introduction portion, liquid phase introduction portion and discharge portion can be arbitrarily designed within the range of a suitable shape and structure for the microchannels.

The present invention efficiently and stably forms a gas/liquid mixed phase flow in a fixed bed by adjusting pressure drop in the gas phase introduction portion and the liquid phase introduction portion. At this time, when $\Delta P_g$ represents the pressure loss of the gas phase introduction piping when the gas phase has passed therethrough, and $\Delta P_l$ represents the pressure loss when the liquid phase has passed through the fixed bed reactor, a combination of piping of certain cross-sectional areas and/or packing material structure is required to be formed so that $\Delta P_g > 5\Delta P_l$ is maintained under the reaction conditions.

Although the adjustment of pressure drop can be controlled with the flow rates of the gas phase and liquid phase that pass through the gas phase introduction portion and fixed bed portion respectively, these refer to the cases relating to reaction conditions and reaction parameters of the reaction process. With respect to a fixed bed reactor, since the operation during which these parameters to be considerably changed, which affects the reaction performance, the adjustment of pressure drop is preferably carried out using the configuration of the reactor per se and the ratio of the cross-sectional area of the gas phase introduction portion to the cross-sectional area of the fixed bed, and more specifically, is determined by the configuration of the cross-sectional area of the fixed bed, the pressure drop of the gas phase introduction portion piping and the pressure drop when the liquid phase has passed through the fixed bed reactor. The range of the ratio of the cross-sectional area of the gas phase introduction portion to the cross-sectional area of the fixed bed is preferably within the range of 0.0001 to 0.05 and more preferably within the range of 0.0002 to 0.02. Fabricating an introduction portion whose cross-sectional area ratio is less than 0.0001 may be difficult, while in the case the cross-sectional ratio exceeds 0.05, the introduction portion must be designed having a greater length in order to ensure the pressure drop required for forming a stable mixed gas/liquid phase flow, thereby resulting in the size of the microreactor being unnecessarily large, and making it undesirable.

A catalyst corresponding to the target reaction can be filled into the fixed bed of the fixed bed reactor of the present invention. For example, in a reactor used for the purpose of producing hydrogen peroxide using hydrogen and oxygen, a catalyst supported by precious metal particles, and preferably a catalyst containing at least one type of precious metal selected from the group consisting of palladium, gold and platinum, can be used.

Next, in providing an explanation about the reaction process of the present invention, although the conditions under which the reactor is used vary considerably according to the target reaction, since the reactor is basically a fixed bed reactor, in consideration of the pressure drop when the liquid phase passes there through, the operation at a superficial velocity in excess of $10^{-2}$ m/s is undesirable. On the other hand, in order to maintain the fixed bed in a state in which it is wetted by the liquid phase, the liquid phase preferably has a linear velocity of $10^{-5}$ m/s or more. Similarly, in consideration of drying the fixed bed during the gas/liquid mixed phase reaction and the pressure drop acting on the gas phase introduction portion piping when the gas phase passes there through, the gas phase is preferably not distributed at a linear velocity of more than 10 m/s, and from the viewpoint of forming a stable mixed gas/liquid phase flow, the gas phase preferably passes through the fixed bed at a linear velocity of 0.01 m/s or more.

Although the reactor of the present invention can preferably be used for a mixed phase reaction of a gas phase and a liquid phase, in the case of filling the fixed bed with a catalyst in particular, it can be preferably used for a hydrogenation reaction or oxygen oxidation reaction and the like. Though depending on the reaction, the liquid phase component may contain a reaction substrate, and in the case the reaction substrate is a solid, the reaction substrate may be allowed to flow through the reactor after being dissolved in a solvent.

In the case of using the reactor of the present invention to produce hydrogen peroxide in particular, although the gas component contains hydrogen and oxygen, other gas components such as nitrogen may also be contained, and the main component of the liquid phase component is preferably water and/or methanol. Water and alcohol, preferably water and methanol, may be mixed at an arbitrary ratio corresponding to the purpose of use, and a stabilizer for keeping the hydrogen peroxide stable can also be suitably contained.

In order to provide a detailed explanation of the configuration of the reactor of the present invention based on the drawings, FIG. 1 shows a drawing of the reactor of the present invention as viewed from a direction perpendicular to the direction of the mixed gas/liquid phase flow that enables all of the microchannels to be seen. The reactor of the present invention is composed of the fixed bed portion C-D (of which a packing material is filled into the channels), the gas phase introduction portion A-B, and the liquid phase introduction portion E-F, the gas phase $f_g$ and the liquid phase $f_l$ are respectively supplied to the fixed bed portion from B and F, and a gas/liquid mixed phase flow $f_{g+l}$ is formed within the fixed bed.

Although FIG. 1 shows an example of the case of a gas phase flow and a liquid phase flow being supplied to the fixed bed respectively from a single gas phase introduction portion and liquid phase introduction portion, in the reactor of the present invention, a configuration can be suitably employed in which the gas phase introduction portion and the liquid phase introduction portion are provided from more than one locations to the fixed bed having the above-mentioned microchannels corresponding to the type of reaction and the purpose of use into which the gas phase flow and the liquid phase flow can be respectively introduced via more than one introduction portions.

In the present invention, the pressure drop of the piping of the gas phase introduction portion is defined to mean the pressure difference between A and D of the gas phase introduction portion and the fixed bed of when only the gas phase has passed through the fixed bed, while the pressure drop when the liquid phase has passed through the fixed bed reactor via the liquid phase introduction portion is defined to mean the pressure difference between E and D of the liquid phase introduction portion and the fixed bed when only the liquid phase has passed through the fixed bed.

More specifically, in the present invention, these pressure losses can be measured by installing pressure gauges at A, D and E. Namely, $\Delta P_l$ can be measured by using the difference in indicated pressures at E and D when the only the liquid phase has passed through the fixed bed, while $\Delta P_g'$ can be measured by using the difference in indicated pressures at A and D when only the gas phase has passed through the fixed bed. In this case, in the case pressure loss between B and D is remarkably small in comparison with $\Delta P_g$ in particular, $\Delta P_g'$ can be approximately defined as the pressure loss between A and B ($\Delta P_g$). In addition, in the case the end (D) of the fixed bed is open to the atmosphere, the pressures measured at A and E directly become $\Delta P_g'$ (approximately $\Delta P_g$) and $\Delta P_l$, respectively.

In the present invention, a fixed bed having a packing material structure of which a packing material is filled into the microchannels is used for the fixed bed of the reactor. The packing material structure in the fixed bed has an action that promotes formation of a gas/liquid mixed phase flow by mixing a gas phase flow $f_g$ and a liquid phase flow $f_l$ that have been introduced into the microchannels of the fixed bed, and in this packing material structure, it is important that the packing material be composed so as to have in addition to catalytic action the shape and structure capable of more effectively promoting the formation of a mixed gas/liquid phase flow.

More specifically, although it is important for the formation of the gas/liquid mixed phase flow to be promoted by arbitrarily designing and setting the size, shape and filling method of the packing material, the basic configuration of the packing material structure can be arbitrarily designed corresponding to the type of reaction, types of gas phase and liquid phase used, and purpose of using the reactor. Although a catalyst is an example of a packing material, with respect to the specific type of catalyst, a suitable catalyst corresponding to the type of reaction can be used provided that it can be filled into microchannels.

Essential constituents of the present invention are having a packing material structure able to promote the formation of a mixed phase of a gas phase flow and a liquid phase flow by mixing the gas phase flow and the liquid phase flow supplied from the gas phase introduction portion and the liquid phase introduction portion to the microchannels of the fixed bed, with the packing material structure being formed so as to satisfy the previously described condition of $\Delta P_g > 5\Delta P_l$ under mixed gas/liquid phase reaction conditions. Thus, the fixed bed reactor of the present invention is essentially distinguished from a fixed bed reactor having a packing material structure that does not promote the formation of mixed gas/liquid phase flow or a known fixed bed reactor having, ordinary microchannels in which a packing material structure is not formed so as to satisfy the previously described condition $\Delta P_g > 5\Delta P_l$.

In the present invention, gas/liquid mixed phase reaction conditions refer to reaction conditions such that the reaction is not carried out in a state in which a gas phase flow and a liquid phase flow do not form a mixed phase or in a state in which the formation of a mixed phase is inadequate, but is implemented in a state where a mixed phase is formed and a gas/liquid mixed phase reaction is preferably, carried out as a result of a gas phase flow and a liquid phase flow supplied to the fixed bed being favorably mixed in a packing material structure.

In the present invention, a combination of piping of certain cross-sectional areas refers to a specific thickness structure formed as the piping of a gas phase introduction portion and a liquid phase introduction portion composed of microchannels so as to satisfy the condition $\Delta P_g > 5\Delta P_l$, namely a cross-sectional area structure, while the packing material structure refers to a specific packing material structure formed as a packing material filled into the microchannels of the fixed bed so as to satisfy the condition $\Delta P_g > 5\Delta P_l$, namely a packed state of being filled with a packing material. The specific configuration of the cross-sectional shape of the microchannels of the gas phase introduction portion, the liquid introduction portion, and the fixed bed can be arbitrarily designed corresponding to their purpose of use and a preferable fabrication method that achieves the purpose.

The reactor of the present invention does not simply have the piping structure composed of microchannels, but rather is essentially distinguished from a reactor composed of microchannels in that the cross-sectional area of the fixed bed has values on both ends of the range of 0.0001 cm² to 0.008 cm² or a specific value within that range, the reactor has a fixed bed along with a gas phase introduction portion and a liquid phase introduction portion, and when $\Delta P_g$ represents the pressure loss of the piping of the gas phase introduction portion when the gas phase has passed therethrough and $\Delta P_l$ represents the pressure loss when the liquid phase has passed through the fixed bed reactor via the liquid phase introduction portion, has a piping thickness structure formed so as to satisfy the condition $\Delta P_g > 5\Delta P_l$ under mixed gas/liquid phase reaction conditions, and/or a packing material structure that promotes the formation of a mixed gas/liquid phase formed so as to satisfy the same condition, as essential constituents thereof.

Next, an explanation is provided of a second aspect of the present invention.

The present invention is characterized in that, in a fixed bed reactor for carrying out a mixed gas/liquid phase reaction, the reactor has a piping structure composed of microchannels, has two or more parallel fixed beds having a cross-sectional area of 0.0001 to 0.008 cm², and has, in addition to the fixed beds, a gas phase distribution portion, a portion for introducing the gas phase to the fixed bed, a liquid phase distribution portion, a portion for introducing the liquid phase to the fixed bed, a packing material introduction portion, and a fluid merging portion. In the present invention, although normally several to more than ten fixed beds are arranged in parallel, the number of fixed beds arranged in parallel can be suitably set to a suitable range of two or more.

In the present invention, when $\Delta P_{g-d}$ and $\Delta P_{g-i}$ represent respectively the pressure drop of the piping of a gas phase distribution portion and the pressure drop of a gas phase introduction portion, $\Delta P_{l-d}$ and $\Delta P_{l-I}$ represent respectively the pressure drop of the piping of a liquid phase distribution portion and the pressure drop of a liquid phase introduction portion, $\Delta P_{l-p}$ represents the pressure loss of a fixed bed portion of the pressure drops when a liquid phase has passed through the parallely arranged fixed beds, and $\Delta P_o$ represents the pressure loss when the liquid phase has passed through the fluid merging portion located at the end of the fixed bed, then all of the following conditions 1) to 4) are satisfied, and in the case of two or more fixed beds arranged in parallel, the reactor of the present invention has a packing material structure in which each liquid is evenly distributed:

1) the ratio of the cross-sectional area of the gas phase introduction portion to the cross-sectional area of the fixed bed is within the range of 0.0001 to 0.05, and the ratio of the cross-sectional area of the liquid phase introduction portion to the cross-sectional area of the fixed bed is within the range of 0.0003 to 0.3, 2) $\Delta P_{l-i} > 10\Delta P_{l-d}$ and $\Delta P_{g-i} > 10\Delta P_{g-d}$, 3) $\Delta P_{l-p} > 2.5\Delta P_o$, and 4) $\Delta P_{g-i} > 5\Delta P_{l-p}$.

In addition, the present invention is mixed gas/liquid phase reaction process for carrying out a mixed gas/liquid phase reaction by using the fixed bed reactor described above, wherein the mixed gas/liquid phase reaction is carried out by operating the fixed bed reactor under conditions such that the linear velocity of the gas phase is 0.01 to 10 m/s and the linear velocity of the liquid phase is $10^{-5}$ to $10^{-2}$ m/s in each of parallely arranged microchannels.

In the fixed bed reactor of the present invention, the gas phase supplied for reaction from the gas phase introduction portion is introduced into the microchannels of the fixed beds, the liquid phase supplied for reaction from the liquid phase introduction portion is introduced to the microchannels of the fixed beds, and, after the gas phase and the liquid phase have been dispersed into each of the parallely arranged microchannels by a branching structure using the portion for introducing the gas phase to the fixed bed and the portion for introducing the liquid phase to the fixed bed, the gas phase and the liquid phase are contacted in the fixed bed microchannels having a packing material structure.

Next, after having carried out the formation of a gas/liquid mixed phase and a mixed gas/liquid phase reaction, a procedure is carried out whereby a reaction product is discharged from a discharge portion provided in the fixed bed. The reactor may be fabricated by coupling piping, or may be fabricated as an integrated reactor in which microchannels that satisfy the above-mentioned conditions are formed by processing a material that is stable with respect to the reaction conditions such as a metal plate, silicon plate or glass plate.

At this time, in addition to the fixed bed, the reactor has a gas phase distribution portion, a portion for introducing the gas phase to the fixed bed, a liquid phase distribution portion, a portion for introducing the liquid phase to the fixed bed, a packing material introduction portion and a fluid merging portion, and when $\Delta P_{g-d}$ and $\Delta P_{g-i}$ represent respectively the pressure drop of the piping of the gas phase distribution portion and the pressure drop of the gas phase introduction portion, $\Delta P_{l-d}$ and $\Delta P_{l-i}$ represent respectively the pressure drop of the piping of the liquid phase distribution portion and the pressure drop of the liquid phase introduction portion, $\Delta P_{l-p}$ represents the pressure drop of the fixed bed portion of pressure drop when the liquid phase has passed through the parallel arranged fixed beds, and $\Delta P_o$ represents the pressure drop when the liquid phase has passed through the fluid merging portion following the fixed bed, the reactor is required to form a piping thickness structure and/or packing material structure such that all of the following conditions 1) to 4) are satisfied:

1) the ratio of the surface area of the gas phase introduction portion to the surface area of the fixed bed is within the range of 0.0001 to 0.05, and the ratio of the surface area of the liquid phase introduction portion to the surface area of the fixed bed is within the range of 0.0003 to 0.3, 2) $\Delta P_{l-i} > 10 \Delta P_{l-d}$ and $\Delta P_{g-i} > 10 \Delta P_{g-d}$, 3) $\Delta P_{l-p} > 2.5 \Delta P_o$, and 4) $\Delta P_{g-i} > 5 \Delta P_{l-p}$.

More specifically, the fixed bed reactor is defined by the configuration of the cross-sectional area of the fixed bed, the pressure loss of the gas phase introduction piping and the pressure loss when the liquid phase has passed through the fixed bed reactor. The range of the ratio of the cross-sectional area of the gas phase introduction portion to the cross-sectional area of the fixed bed is within the range of 0.0001 to 0.05 and preferably within the range of 0.0002 to 0.02. In addition, the ratio of the cross-sectional area of the liquid phase introduction portion to the cross-sectional area of the fixed bed is within the range of 0.0003 to 0.3 and preferably within the range of 0.001 to 0.1.

Next, in providing an explanation of the reaction process of a gas/liquid mixed phase reaction of the present invention, although the conditions under which the reactor is used vary considerably according to the target reaction, since the reactor is basically a fixed bed reactor, in consideration of the pressure drop when the liquid phase passes there through, it is preferably operated at a linear velocity of the liquid phase of $10^{-2}$ m/s or less. On the other hand, in order to maintain the fixed bed in a state in which it is wetted by the liquid phase, the liquid phase preferably has a linear velocity of $10^{-5}$ m/s or more. Similarly, in consideration of drying the fixed bed during the mixed gas/liquid phase reaction and the pressure drop acting on the gas phase introduction portion piping when the gas phase passes therethrough, the gas phase is preferably not distributed at a linear velocity of more than 10 m/s, and from the viewpoint of forming a stable mixed gas/liquid phase flow, the gas phase preferably passes through the fixed bed at a linear velocity of 0.01 m/s or more.

FIG. 2 shows an explanatory drawing as viewed from a direction perpendicular to the direction of the gas/liquid mixed phase flow that enables all of the microchannels to be seen in order to provide a detailed explanation of the configuration of the fixed bed reactor of the present invention based on the drawings. In this drawing, the reference symbol O represents the flow merging portion, while the reference symbol G+L represents a gas/liquid mixed phase outlet of the gas phase and liquid phase.

The fixed bed reactor of the present invention is composed of a gas phase inlet (G), a liquid phase inlet (L), a gas phase distribution portion (Gd), a liquid phase distribution portion (Ld), a packing material introduction portion (S-S'), a fixed bed portion from Ck to Dk (where a packing material is filled into a channel), a gas phase introduction portion from Ak to Bk, and a liquid phase introduction portion from Ek to Fk (wherein, k represents a natural number from 1 to n, and corresponds to the number of parallel channels).

$\Delta P_{g-d}$ represents the pressure loss of the gas phase distribution portion, $\Delta P_{l-d}$ represents the pressure loss of the liquid phase distribution portion, and $\Delta P_o$ represents the pressure loss that occurs at the merging portion (O) when only a liquid phase has passed through the reactor. In addition, $f_{gk}$ represents the gas phase flow introduced to the kth fixed bed, $f_{lk}$ represents the liquid phase flow introduced to the kth fixed bed, and $f_{g+l-k}$ represents the mixed gas/liquid phase flow that passes through the kth fixed bed.

Prior to the reaction, a packing material such as a catalyst is introduced into each microchannel Ck-Dk via the packing material introduction portion S-S'. During the reaction, a gas phase component is distributed to the parallely arranged microchannels from the gas phase inlet G via the gas phase distribution portion Gd, and with respect to the liquid phase component, the gas phase flow $f_g$ and the liquid phase flow $f_l$ are supplied respectively from B and F to the fixed bed portion, and the gas/liquid mixed phase flow $f_{g+l}$ is formed within the fixed bed.

Although FIG. 2 shows an example in the case of a gas phase flow and a liquid phase flow being supplied to a fixed bed from a single gas phase introduction portion and liquid phase introduction portion with respect to each parallely arranged fixed bed microchannel, the fixed bed reactor of the present invention can be suitably composed corresponding to the type and purpose of use of the reaction such that the gas phase introduction portion and the liquid phase introduction portion are provided from more than one locations to the fixed bed having the above-mentioned microchannels, and the gas phase flow and the liquid phase flow are respectively able to be introduced to the fixed bed via more than one introduction portions. In addition, although FIG. 2 shows a structure in which all the microchannels can be filled with a packed material such as a catalyst simultaneously, a structure may also be employed in which each microchannel can be filled separately.

FIG. 3 shows an explanatory drawing of the kth gas phase introduction portion, liquid phase introduction portion and fixed bed portion. The reference symbol Ck-Dk represents the fixed bed portion, Ak-Bk the gas phase introduction portion, and Ek-Fk the liquid phase introduction portion, while $f_{gk}$ represents the gas phase flow introduced to the kth fixed bed, $f_{lk}$ represents the liquid phase flow introduced to the kth fixed bed, and $f_{g+l-k}$ represents the mixed gas/liquid phase flow that flows through the kth fixed bed. In addition, $\Delta P_{g-ik}$ represents the pressure loss of the gas phase introduction portion, $\Delta P_{l-ik}$ represents the pressure loss of the liquid phase introduction portion, and $\Delta P_{l-pk}$ represents the pressure loss that occurs when only the liquid phase passes through the fixed bed.

In the present invention, the pressure loss $\Delta P_{g-d}$ of the piping of a gas phase distribution portion can be defined as the pressure drop that occurs in the gas phase distribution portion Gd when the gas phase has passed through, and more specifically, can be defined as the pressure drop that occurs between the beginning of the branching and the end of the branching (Ak). Thus, although this pressure loss can originally be defined as $\Delta P_{g-dk}$ for each branch, in the case the dispersions in each branch are clearly insignificant, it can be defined as $\Delta P_{g-d}$ by using the average value of $(\Delta P_{g-d})$ k as a representative value. In addition, the pressure drop $\Delta P_{g-i}$ of the gas phase introduction portion can be defined as the pressure drop of the gas phase introduction portion Ak-Bk (where, k is a natural number of 1 to n), and although this pressure loss is originally defined as $\Delta P_{g-ik}$ for each introduction portion, in the case the dispersions in each introduction portion are clearly insignificant, it can be defined as $\Delta P_{g-i}$ by using the average value of $\Delta P_{g-ik}$ as a representative value. Similarly, the pressure drop $\Delta P_{l-d}$ of the piping of the liquid phase distribution portion can be defined as the pressure drop that occurs in the liquid phase distribution portion Ld when the liquid phase has passed through, and more specifically, can be defined as the pressure drop that occurs between the beginning of branching and the end of the branching (Ek). Thus, although this pressure loss is originally defined as $\Delta P_{l-dk}$ for each branch, in the case the dispersions in each branch are clearly insignificant, it can be defined as $\Delta P_{l-d}$ by using the average value of $(\Delta P_{l-d})$ k as a representative value. In addition, the pressure drop $\Delta P_{l-i}$ of the liquid phase introduction portion can be defined as the pressure drop of Ek-Fk (wherein, k is a natural number of 1 to n), and although this pressure drop is originally defined as $\Delta P_{l-ik}$ for each introduction portion, in the case the dispersions in each introduction portion are clearly insignificant, it can be defined as $\Delta P_{l-i}$ by using the average value of $\Delta P_{l-ik}$ as a representative value.

Moreover, the pressure drop that occurs when only a liquid phase has passed through a fixed bed can be defined as $P_{l-p}$, while the pressure drop that occurs in the merging portion (O) when only a liquid phase has passed through the reactor can be defined as $\Delta P_o$. As shown in FIG. 3, although $\Delta P_{l-p}$ is the pressure drop that occurs between Fk and Dk when the liquid phase has passed through the fixed bed, if the pressure drop that occurs between Ck and Fk when the liquid phase passes through is sufficiently small such as when Fk and Ck are in close proximity, it may be approximately treated as the pressure drop that occurs between Ck and Dk. Thus, although $\Delta P_{l-p}$ is also defined as $(\Delta P_{l-p})$ k for each fixed bed, in the case variations in each fixed bed are clearly insignificant, it can be defined as $\Delta P_{l-p}$ by using the average value of $(\Delta P_{l-p})$ k as a representative value. In addition, although $\Delta P_o$ is originally defined as $(\Delta P_o)$ k between the end portion Dk of the fixed bed and a merging point, in the case the variations in each are clearly small, it can be defined as $\Delta P_o$ by using the average value of $(\Delta P_o)$k as a representative value.

Although pressure can be measured by attaching a pressure gauge to the above mentioned portion of the reactor, in cases in which it is difficult to attach a pressure gauge, the estimation of pressure drop according to the following equations is effective within the scope of the present invention. For example, the following Hagen-Poiseuille equation is effective for estimating the pressure drop in a gas introduction channel and liquid introduction channel. With respect to fluids flowing through circular piping, the pressure drop can be represented by the Hagen-Poiseuille equation.

[Equation 1]

$$\frac{(-\Delta P)_E}{l} = \frac{32\mu_g u_g}{D^2} \quad (1)$$

On the other hand, the estimation by the following Ergun equation is effective for estimating the pressure drop according to the flow within a fixed bed.

[Equation 2]

$$\frac{(-\Delta P)_{\mu g}}{L} = \frac{f v_{\mu g}^2 \rho_{u_g}}{d_p} \quad (2)$$

[Equation 3]

$$f = [1.75 + 1.50(1 - e_B)/Re_{liq}](1 - e_B)/\varepsilon_B^3 \quad (3)$$

Where, in Equation (1), the left side indicates the pressure loss that occurs due to the flow of a gas phase per unit length in the gas phase or liquid phase introduction portion, and on the right side of the equation, $\mu_g$ indicates the viscosity of the gas phase or liquid phase, $u_g$ indicates the average linear velocity in the gas phase or liquid phase introduction portion, and D indicates the inner diameter of the pipe. In the case the cross-sectional shape of the tubing is not circular, D can be assumed to be the inner diameter of a circle having an equal cross-sectional area. On the other hand, in Equation (2), the left side indicates the pressure drop per unit length that occurs when only a liquid phase flows through the fixed bed, and on the right side of the equation, $v_{liq}$ indicates the superficial velocity of a liquid phase, $\rho_{liq}$ indicates liquid density, and $d_p$ indicates the diameter of a packing material. In addition, for f (friction coefficient) calculated in Equation (3), $\epsilon_B$ indicates the void fraction of a fixed bed, while $Re_{liq}$ indicates the Reynolds number when a liquid phase passes through a fixed bed.

[References: (1) R. Byron Bird, Warren E. Stewart, Edwin N. Lightfoot, co-authors, "Transport Phenomena Second Edition", 2002, publisher: John Wiley & Sons, Inc., Hoboken, N.J. (ISBN: 0-471-41077-2); (2) H. Scott Fogler, author, "Elements of Chemical Reaction Engineering, 3rd Ed.", 1999, publisher: Prentice-Hall, Inc., Upper Saddle River, N.J. (ISBN: 0-13-531708-8)].

In the present invention, a fixed bed having a packing material structure of which a packing material is filled into the microchannels is used for the fixed bed of a reactor. The packing material structure in the fixed bed has the effect of promoting the formation of a mixed gas/liquid phase flow by mixing a gas flow $f_g$ and a liquid phase flow $f_l$ that have been introduced into the microchannels of the fixed bed, and in this packing material structure, it is important that the packing material be composed so as to have, other than catalytic action, a shape and structure capable of more effectively promoting the formation of a gas/liquid mixed phase flow.

More specifically, although it is important for the formation of the mixed gas/liquid phase flow to be formed by arbitrarily designing and setting the size, shape and filling method of the packing material, the basic configuration of the packing material structure can be arbitrarily designed corresponding to the type of reaction, types of gas phase and liquid phase used, and purpose of using the reactor. Although a catalyst is one of the examples of packing materials, with respect to the specific type of catalyst, a suitable catalyst corresponding to the type of reaction can be used provided it can be filled into microchannels.

Essential constituents of the present invention consist of having a packing material structure able to promote the formation of a mixed phase of a gas phase flow and a liquid phase flow by mixing the gas phase flow and the liquid phase flow supplied respectively from the gas phase introduction portion and the liquid phase introduction portion to the microchannels of the fixed bed, and the packing material structure being formed so as to satisfy the previously described conditions of $\Delta P_{l-i} > 10 \Delta P_{l-d}$, $\Delta P_{g-i} > 10 \Delta P_{g-d}$, $\Delta P_{l-p} > 2.5 \Delta P_o$ and $\Delta P_{g-i} > 5 \Delta P_{l-p}$ under mixed gas/liquid phase reaction conditions.

Thus, the fixed bed reactor of the present invention is essentially distinguished from a fixed bed reactor having a packing material structure that does not promote the formation of mixed gas/liquid phase flow and from any of the known reactors having, ordinary microchannels in which the packing material structure is not formed so as to satisfy the previously described conditions. In the present invention, gas/liquid mixed phase reaction conditions refer to conditions such that the reaction is not carried out in a state in which a gas phase flow and a liquid phase flow do not form or in a state in which the formation of a mixed phase is inadequate as these are not adequately mixed, but rather refer to reaction conditions such that a mixed phase is formed as a result of a gas phase flow and a liquid phase flow supplied to the fixed bed being favorably mixed in a packing material structure, and a mixed gas/liquid phase reaction is preferably carried out.

In the present invention, during the direct synthesis of hydrogen peroxide from hydrogen and oxygen, the reaction is started in a reducing atmosphere, the direct synthesis reaction of hydrogen peroxide is next carried out in the presence of hydrogen and oxygen, and finally the reaction is stopped in a reducing atmosphere.

In the present invention, after filling a hydrogen peroxide synthesis catalyst such as a palladium catalyst into the microchannels, a suitable amount of hydrogen gas or a mixed gas of hydrogen and nitrogen is passed through the microchannels, and after adequately ensuring a reducing atmosphere on the catalyst surface and in the microchannels, oxygen is introduced to initiate the reaction. According to this procedure, the synthesis yield of hydrogen peroxide increases remarkably.

When terminating the reaction, after terminating the hydrogen peroxide synthesis reaction by discontinuing the supply of oxygen, a suitable amount of hydrogen gas or a mixed gas of hydrogen and nitrogen is passed through the microchannels, and the process is completed after adequately ensuring a reducing atmosphere on the catalyst surface and in the microchannels. According to this procedure, the reaction performance in the case of restarting the reaction can be maintained in a favorable state.

When starting and/or stopping the reaction, the composition of the gas phase that is contacted with the catalyst preferably contains 1 volume percent or more of hydrogen when converted to volume. Although there are no particular limitations on the upper limit thereof, in the case of synthesizing hydrogen peroxide by contacting hydrogen and oxygen with a catalyst, for example, a method that enables the hydrogen content to be at the upper limit value under steady state reaction conditions facilitates use in a continuous reaction process using the microreactor of the present invention. Namely, as an example of such a method, in the case of producing hydrogen peroxide using a gas phase having certain contents of hydrogen and oxygen, at the start of the reaction, the gas phase flow is started under conditions consisting of containing an equal amount of hydrogen and replacing the equivalent amount of oxygen with nitrogen, followed by carrying out the reaction under constant conditions by gradually replacing the nitrogen with oxygen. Similarly, when stopping the reaction, an example of a method that can be employed consists of replacing the oxygen with an inert gas such as nitrogen from the steady state conditions, and then stopping the reaction after allowing the passage of a certain amount of time after the oxygen has been completely replaced.

Although there are no particular limitations on the amount of time required when starting and/or stopping the reaction, for example, the amount of the hydrogen flow when converted to mass (moles) is preferably in larger excess with respect to the mass (moles) of palladium contained in the catalyst. In addition, since the role of the reaction starting and/or stopping operation is to activate the catalyst and allow a continuous reaction procedure to be carried out smoothly, the reaction solution is preferably supplied under the same conditions under which the continuous reaction is carried out. Similarly, during the series of processes of the continuous reaction procedure from starting to stopping the reaction, the reaction temperature is preferably as constant as possible.

The catalyst component of palladium catalysts is known to elute when exposed to an oxidative atmosphere such as containing only oxygen and nitrogen, and the present invention is considered to be effective in maintaining the activity of a catalyst containing palladium during hydrogen peroxide synthesis from hydrogen and oxygen by inhibiting the runoff of catalyst components in this manner (Japanese Patent Application Laid-open No. H4-16501). However, in a conventional fixed bed reactor not composed of microchannels, in the case of allowing a catalyst to be contacted with an atmosphere of hydrogen and oxygen used in a continuous reaction procedure after having been contacted with a reducing atmosphere, the potential for an explosion cannot be avoided since the procedure is forced to go through a composition containing an explosive mixture of hydrogen and oxygen. Similarly, there is also the risk of an explosion in the case of changing the gas phase composition from reaction conditions towards reaction stopping conditions. The present invention, which is characterized by the use of a fixed bed reactor composed of microchannels from the start of the reaction, during a continuous reaction procedure and during stopping the reaction, is essentially distinguished from the technologies using a conventional fixed bed reactor or other types of a reactor in the synthesis of hydrogen peroxide using hydrogen and oxygen.

The following effects are demonstrated by the present invention.

(1) A novel fixed bed gas/liquid mixed phase reactor can be provided that enables a gas/liquid mixed phase reaction to be carried out stably and under constant conditions using microchannels, and improves reaction performance such as by increasing the efficiency of mass transfer from the gas phase to the liquid phase.

(2) A novel fixed gas gas/liquid mixed phase reactor can be provided that enhances productivity by arranging the microchannels in parallel.

(3) The use of the gas/liquid mixed phase reactor composed of microchannels of the present invention makes it possible to safely handle a mixed gas containing an explosive composition of hydrogen and oxygen while controlling flow rate.

(4) As a result of having a fixed bed of which a catalyst is filled into the microchannels, the efficiency of mass transfer from the gas phase to the liquid phase can be increased as compared with conventional reactors by increasing the gas/liquid contact interface.

(5) Although the concentration of hydrogen peroxide obtained with a conventional reactor is limited to a low value of 0.2% by weight, the reactor of the present invention allows an aqueous hydrogen peroxide having a concentration of 1.0% by weight or more to be obtained under constant conditions.

(6) Mass transfer from the gas phase to the liquid phase can be carried out at the efficiency of 10 to 100 times compared with conventional reactors.

(7) Although reactions were limited to being carried out under conditions in which hydrogen partial pressure is reduced to 4% or less in the prior art, in the present invention, hydrogen peroxide can be produced both safely and under constant conditions under explosive conditions in which the hydrogen content is 20 to 50%. In addition, safety can be further guaranteed even in the case of carrying out the reaction under conditions in which hydrogen partial pressure is reduced to 4% or less.

(8) The risk of explosion can be avoided by using microchannels, and catalyst activity can be maintained by maintaining the catalyst in a reducing atmosphere.

(9) The reaction can be carried out under the steady state conditions from the start, abnormal heating of a catalyst and the exposure of a catalyst to an oxidative atmosphere caused by an excessive consumption of hydrogen can be prevented, and catalyst degradation caused by heat or runoff of catalyst components can be inhibited.

Figure 1:
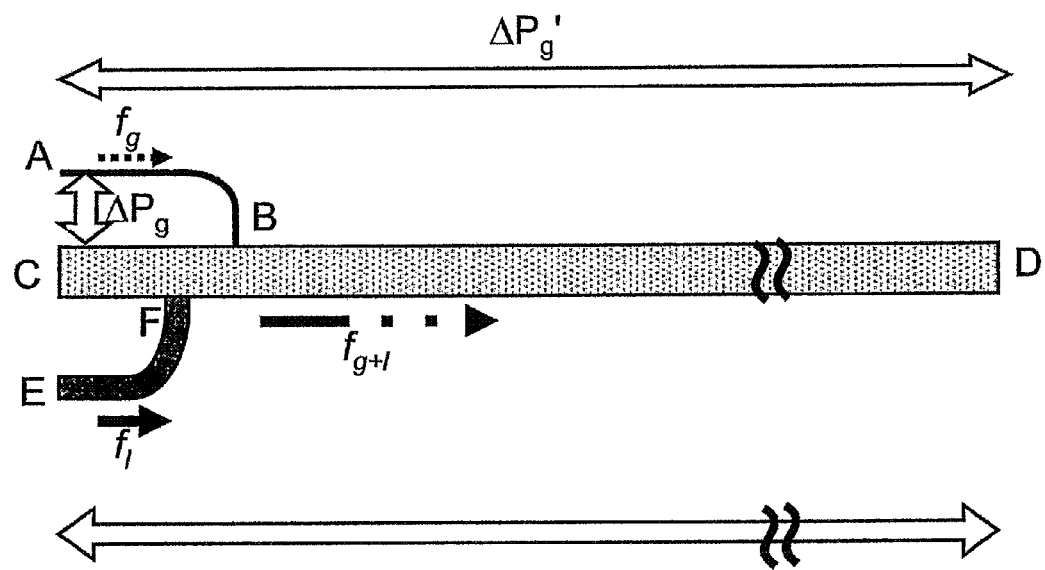
FIG. 1 is a drawing of a reactor of the present invention as viewed from a direction perpendicular to the direction of the mixed gas/liquid phase flow that enables all of the microchannels to be seen. The reactor of the present invention is composed of a fixed bed portion (C-D, in which a packing material is filled into the channels), a gas phase introduction portion (A-B) and a liquid phase introduction portion (E-F), a gas phase ($f_g$) and a liquid phase ($f_l$) are respectively supplied to the fixed bed portion from B and F, and a mixed gas/liquid phase flow ($f_{g+l}$) is formed within the fixed bed.

EXPLANATION OF REFERENCE NUMERALS (Reference Symbols of FIG. 2)
G Gas phase introduction port
L Liquid phase introduction port
Gd Gas phase distribution portion
Ld Liquid phase distribution portion
S-S' Packing material introduction portion
Ck-Dk (k: 1 to n) Fixed bed portion
Ak-Bk (k: 1 to n) Gas phase introduction portion
Ek-Fk (k: 1 to n) Liquid phase introduction portion
$f_{gk}$ Gas phase flow introduced to kth fixed bed
$f_{lk}$ Liquid phase flow introduced to kth fixed bed
$f_{g+l-k}$ Mixed gas/liquid phase flow introduced to kth fixed bed
$\Delta P_{g-d}$ Pressure loss of gas phase distribution portion
$\Delta P_{l-d}$ Pressure loss of liquid phase distribution portion
$\Delta P_o$ Pressure loss occurring in merging portion (O) when only liquid phase is passed through reactor
O Fluid merging portion
G+L Mixed gas/liquid phase outlet
(Reference Symbols of FIG. 3)
Ck-Dk (k: 1 to n) Fixed bed portion
Ak-Bk (k: 1 to n) Gas phase introduction portion
Ek-Fk (k: 1 to n) Liquid phase introduction portion
$f_{gk}$ Gas phase flow introduced to kth fixed bed
$f_{lk}$ Liquid phase flow introduced to kth fixed bed
$f_{g+l-k}$ Mixed gas/liquid phase flow introduced to kth fixed bed
$\Delta P_{g-ik}$ Pressure loss of gas phase introduction portion
$\Delta P_{l-ik}$ Pressure loss liquid phase introduction portion
$\Delta_{Pl-pk}$ Pressure loss occurring when only liquid phase is passed through fixed bed

BEST MODE FOR CARRYING OUT THE INVENTION

Although the following provides a detailed explanation of the present invention by showing examples and comparative examples thereof, the following examples and comparative examples do not limit the scope of the present invention.

EXAMPLE 1

A fixed bed reactor was fabricated in the present example. The microchannels of a reactor composed of a gas phase introduction portion, liquid phase introduction portion, fixed bed portion and mixed gas/liquid phase discharge portion were fabricated on a Tempax® glass plate measuring 30 mm×70 mm with double side polished by forming grooves therein by chemical etching with hydrofluoric acid. The grooves were formed into a semi-elliptical shape having a depth of 20 μm and width of 50 μm. Drilling was carried out for the fixed portion, the liquid phase introduction portion and the mixed gas/liquid phase discharge portion on the plate in which the microchannel grooves of the reactor had been formed by etching.

The shape of the fixed portion had a width of 600 μm and a depth of 300 μm the other hand, holes having a diameter of 1 mm were formed by drilling to form a gas phase introduction port, liquid phase introduction port and gas/liquid mixed phase discharge port on a Tempax glass plate of the same size. Finally, the two Tempax glass plates were laminated by thermal bonding to produce a fixed bed reactor.

A more detailed explanation of the structure of the fixed bed reactor is provided using FIG. 1. The fixed reactor is composed of two gas phase introduction pipes (A-B), one liquid phase introduction pipe (E-F) and a fixed bed portion (C-D), the two gas phase introduction pipes have a width of 50 μm and depth of 20 μm, and the length of the short pipe is 10 mm while the length of the long pipe is 25 mm. The liquid phase introduction pipe has a width of 600 μm, depth of 50 μm and length of 13 mm. On the other hand, the fixed bed portion has a width of 600 μm, depth of 300 μm and length of 55 mm. The locations of B1, B2 (two locations corresponding to the two gas phase introduction pipes) and F were at 11 mm, 9 mm and 5 mm, respectively, when measured from C.

Next, porous silica having a mean particle diameter of 100 μm (FL-100D, Fuji Silysia Chemical Ltd.) was filled into the fixed bed portion of the reactor. Water at a flow rate of 0.01 ml/min from the liquid phase introduction port and nitrogen gas at a flow rate of 0.5 ml/min from the long gas phase introduction pipe were respectively passed through the reactor. On the other hand, the inlet of the short gas phase introduction pipe was sealed. At this time, the formation of a stable gas/liquid mixed phase flow and almost no entry of the liquid phase into the gas phase introduction portion were able to be confirmed. At this time, the pressure difference between A and D was about 1 atm, and this closely corresponded to the pressure loss between A and B (gas phase introduction pipe). On the other hand, the pressure difference between E and D where only water passed through the fixed reactor at the rate of 0.01 ml/min was less than 0.1 atm.

Moreover, a palladium-supported alumina catalyst containing 5% by weight of palladium and having a mean particle diameter of 50 to 60 µm (N.E. Chemcat Corp.) was filled into the fixed bed with a length of about 40 mm downstream of B of FIG. 1 instead of the porous silica, the reaction solution at a flow rate of 0.01 ml/min and a mixed gas of hydrogen and oxygen (hydrogen content: 40%) at a flow rate of 5 ml/min in terms of the standard state flow rate were passed through the fixed bed examining the production of hydrogen peroxide while applying pressure of 10 atm. The reaction solution consisted of an aqueous solution containing 0.025 M sulfuric acid, 0.005 M phosphoric acid and 50 ppm of sodium bromide (weight ratio). At this time, although the long gas phase introduction pipe was used to introduce oxygen having a large flow rate, the pressure difference between A and D at this time was about 0.6 atm. This closely corresponded to the pressure loss between A and B (gas phase introduction pipe). On the other hand, the pressure difference between E and D was determined to be less than 0.1 atm when only water was passed through at a flow rate of 0.01 ml/min. As a result of the reaction, an aqueous hydrogen peroxide having a concentration of 1.5% by weight was obtained under constant conditions.

EXAMPLE 2

A reactor was fabricated in the same manner as Example 1 with the exception of changing the shape of the fixed bed portion to a width of 600 µm and depth of 600 µm. When the mixed gas/liquid phase flow of the reactor was evaluated in the same manner as Example 1, namely when nitrogen was introduced from the long gas phase introduction pipe at the same flow rate and water introduced at the same flow rate using the same packed material, the formation of a stable mixed gas/liquid phase flow and almost no entry of the liquid phase into the gas phase introduction portion were able to be confirmed in the fixed bed portion. The pressure difference between A and D was about 1 atm, and this closely corresponded to the pressure loss between A and B (gas phase introduction pipe). On the other hand, the pressure difference between E and D of when only water passed through the silica-packed fixed bed at a flow rate of 0.01 ml/min was less than 0.1 atm.

Moreover, when the reaction was evaluated in the same manner as Example 1 by filling a palladium-supported alumina catalyst into the fixed bed instead of porous silica over a length of about 40 mm downstream from B of FIG. 1 in the same manner as Example 1, an aqueous hydrogen peroxide was obtained having a concentration of 2.0% by weight.

EXAMPLE 3

A reactor was fabricated in the same manner as Example 1 with the exception of changing the shape of the fixed bed portion to a width of 600 µm and depth of 900 µm. When the mixed gas/liquid phase flow of the reactor was evaluated in the same manner as Example 1 under the same conditions, the formation of a stable mixed gas/liquid phase flow and almost no entry of the liquid phase into the gas phase introduction portion were able to be confirmed in the fixed bed portion. The pressure difference between A and D was about 1 atm, and this closely corresponded to the pressure loss between A and B (gas phase introduction pipe). On the other hand, the pressure difference between E and D when only water was passed through the silica-packed fixed bed at a flow rate of 0.01 ml/min was less than 0.1 atm.

Moreover, when the reaction was evaluated in the same manner as Example 1 by filling a palladium-supported alumina catalyst into the fixed bed instead of porous silica with a length of about 40 mm downstream of B of FIG. 1 in the same manner as Example 1, an aqueous hydrogen peroxide was obtained having a concentration of 3.0% by weight.

COMPARATIVE EXAMPLE 1

In this comparative example, a reactor was fabricated using the same procedure as Example 1 with the exception of drilling the entire gas phase introduction portion. At this time, the gas phase introduction pipes had a width of 200 µm and depth of 50 µm.

Spherical porous silica having a mean particle diameter of 100 µm was filled into the fixed bed portion of the reactor. When water was passed through the reactor from the liquid phase introduction port at a flow rate of 0.01 ml/min and nitrogen gas was passed through at a flow rate of 0.5 ml/min, there was remarkable entry of the liquid phase into the gas phase introduction portion and a mixed gas/liquid phase flow was unable to be formed in the fixed bed portion. At this time, the pressure difference between A and D was less than 0.1 atm. On the other hand, the pressure difference between E and D when only water passed through the silica-packed fixed bed at a flow rate of 0.01 ml/min was also less than 0.1 atm.

In addition, although the production of hydrogen peroxide was examined by filling a palladium-supported alumina catalyst into the reactor instead of porous silica in the same manner as Example 1, and passing an aqueous solution at a flow rate of 0.01 ml/min and a mixed gas of hydrogen and oxygen (hydrogen content: 40%) at a flow rate of 5 ml/min as the standard state flow rate through the reactor followed by applying pressure of 10 atm, the experiment was unable to proceed properly since a stable mixed gas/liquid phase flow was unable to be formed.

EXAMPLE 4

A fixed bed reactor having four parallel channels were fabricated in the present example. The microchannels of the reactors composed of a gas phase introduction portion, liquid phase introduction portion, fixed bed portion and mixed gas/liquid phase discharge portion were fabricated on a Tempax® glass plate measuring 30 mm×70 mm with double side polished by forming grooves therein by chemical etching with hydrofluoric acid.

The grooves were formed into a semi-elliptical shape having a depth of 20 µm and width of 50 µm. Drilling was carried out for the fixed portion, the liquid phase introduction portion and the mixed gas/liquid phase discharge portion on the plate in which the microchannel grooves of a reactor were formed by etching.

The shape of the fixed portion had a width of 600 µm and a depth of 900 µm. On the other hand, holes having a diameter of 1 mm were formed by drilling to form a gas phase introduction port, liquid phase introduction port, and mixed gas/liquid phase discharge port in a Tempax® glass plate of the same size. Finally, the two Tempax® glass plates were laminated by thermal bonding to produce a fixed bed reactor.

Figure 2:
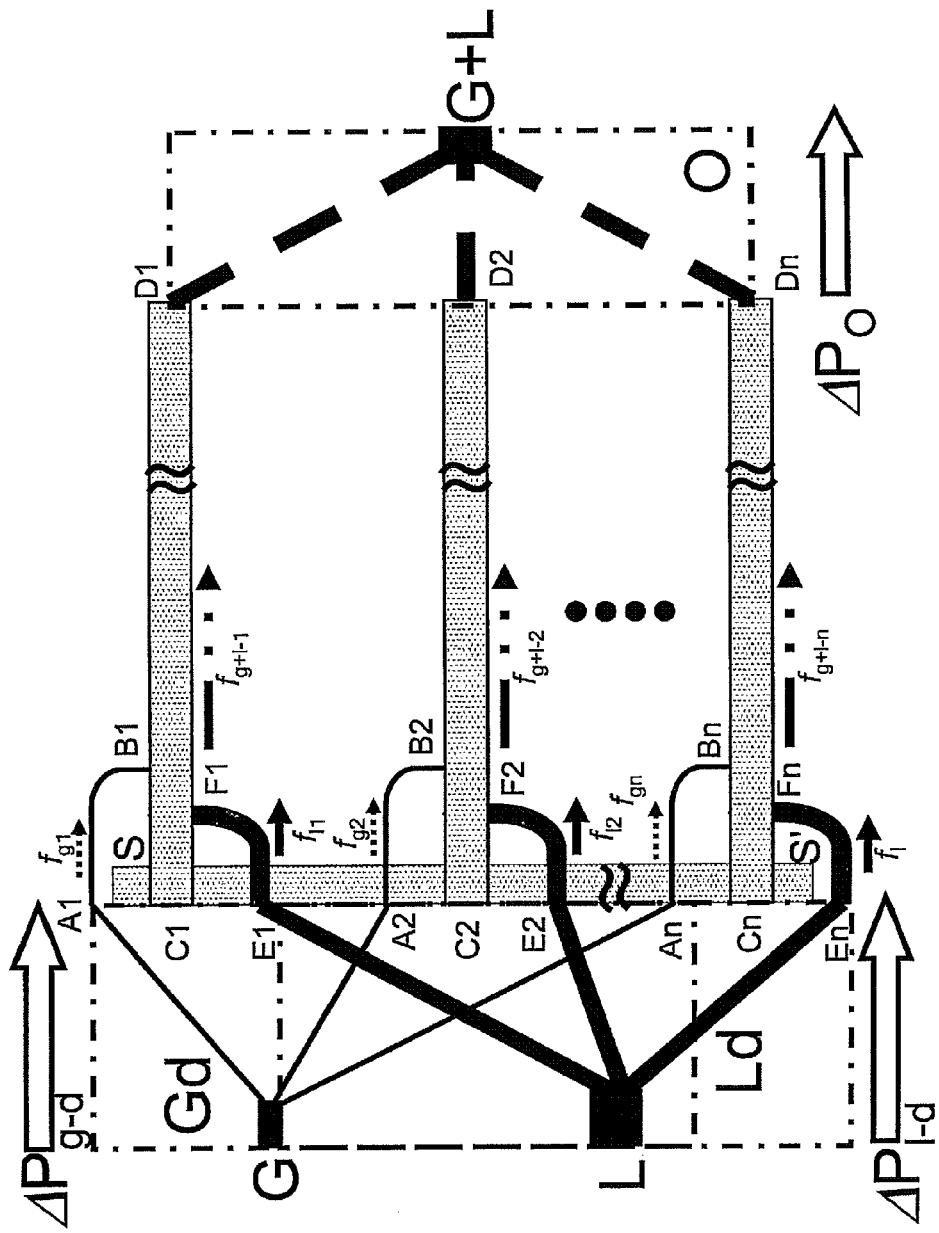
FIG. 2 shows an explanatory drawing as viewed from a direction perpendicular to the direction of the mixed gas/liquid phase flow that enables all of the microchannels to be seen.
Figure 3:
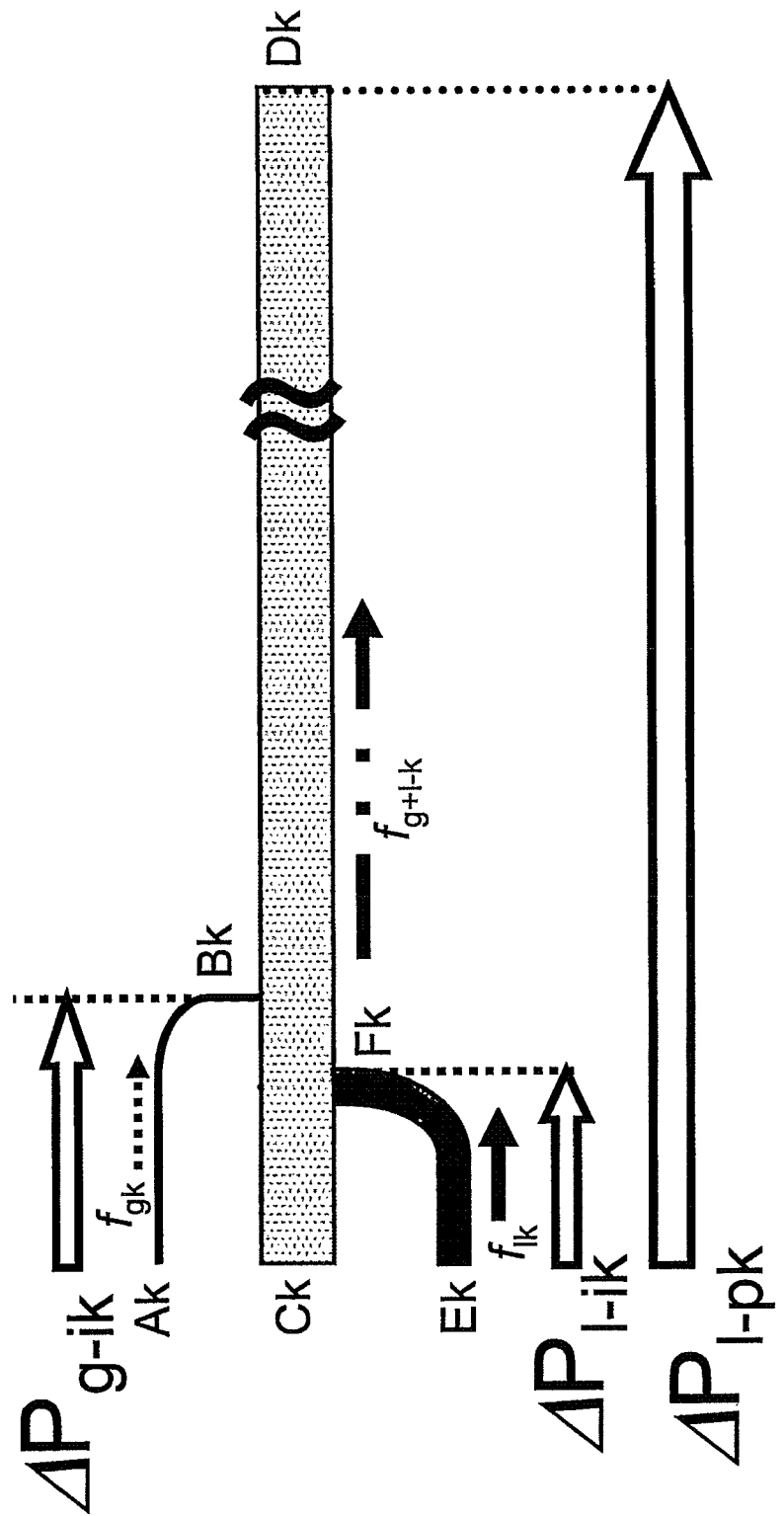
FIG. 3 shows an explanatory drawing of the kth gas phase introduction portion, liquid phase introduction portion and fixed bed portion.

A more detailed explanation of the structure of the fixed bed reactors is provided using FIGS. 2 and 3. The fixed reactor consists of four fixed beds arranged in parallel, i.e. n=4 in FIG. 2. Each fixed bed is composed of two gas phase introduction pipes (Ak-Bk in FIG. 3), one liquid phase introduction pipe (Ek-Fk) and a fixed bed portion (Ck-Dk), the two gas phase introduction pipes have a width of 50 μm and depth of 20 μm, and the length of the short pipe is 9 mm while the length of the long pipe is 28 mm. The channels of the liquid phase introduction pipe have a width of 50 μm, depth of 20 μm and length of 3.5 mm, and are formed at 50 μm intervals, and five microchannels function as a group for a single fixed bed. On the other hand, the fixed bed portion has a width of 600 μm, depth of 900 μm and length of 45 mm. In FIG. 3 the locations of B1$k$, B2$k$ (two locations corresponding to the two gas phase introduction pipes) and Fk were at 4 mm, 3 mm and 0 mm, respectively, when measured from C.

In addition, the portion corresponding to Gd in FIG. 2 was composed of microchannels having a width of 1 mm and depth of 300 gm, and the pressure drop of when a gas phase flew was concentrated in Ak-Bk of FIG. 3, namely, the relationship $\Delta P_{g-i} > 10 \Delta P_{g-d}$ was made to always be valid, and, in addition, the portion corresponding to Ld of FIG. 2 is composed of the microchannels having a depth of 600 μm and depth of 300 μm, and the pressure drop of when a liquid phase flew was concentrated in Ek-Fk of FIG. 3, namely, the relationship $\Delta P_{l-i} > 10 \Delta P_{l-d}$ was made to always be valid. On the other hand, the structure of O of FIG. 2 was made to have a width of 600 μm at all locations. The catalyst was filled up to Dk at all locations (where, k represents a natural number from 1 to n, and n=4 in the present example), and in contrast to the channel depth following the fixed bed outlet being 300 μm, the channel depth at the integrated portion was made to be at least 600 μm and the relationship $\Delta P_{l-p} > 2.5 \Delta P_o$ was made to be valid of when a gas phase flew in consideration of preventing a solid from flowing out to the merging portion.

Next, spherical porous silica having a mean particle diameter of 100 μm was filled into the fixed bed portion of a reactor. Water was passed through the reactor at a flow rate of 0.04 ml/min from the liquid phase introduction port and nitrogen gas was passed through at a flow rate of 2.0 ml/min. Furthermore, nitrogen gas was supplied from both the hydrogen introduction pipe (corresponding to the longer one of the gas phase introduction pipes that lead to each fixed bed) and oxygen introduction pipe (corresponding to the shorter one of the gas phase introduction pipes leading to each fixed bed). The formation of a stable mixed gas/liquid phase flow and almost no entry of the liquid phase into the gas phase introduction portion were able to be confirmed.

Moreover, a palladium-supported alumina catalyst having a mean particle diameter of 50 μm (N.E. Chemcat Corp., palladium content: 5% by weight) was injected with pressure as an aqueous slurry via the portion S-S' of FIG. 2 so as to be filled into each fixed bed with a length of 40 mm in the same manner as Example 1 instead of porous silica, a reaction solution having the same composition as Example 1 at a flow rate of 0.04 ml/min and a mixed gas of hydrogen and oxygen (hydrogen: 20%) at a flow rate of 20 ml/min in terms of the standard state flow rate were passed through each fixed bed to produce hydrogen peroxide while applying pressure of 10 atm. Furthermore, hydrogen and oxygen were supplied separately, and each gas phase was mixed only after having entered the fixed bed portion.

As a result, the pressure difference between G and O in FIG. 2 was about 0.6 atm on both the hydrogen side and oxygen side, and this closely corresponded to the pressure loss between Ak and Bk in FIG. 3. In contrast, the pressure difference between L and O in FIG. 2 when an equal amount of water only was passed through did not reach 0.1 atm. As a result of the reaction, an aqueous hydrogen peroxide having a concentration of 3.5% by weight was obtained under constant conditions.

EXAMPLE 5

Production of hydrogen peroxide was carried out for the same reactor used in Example 4 by filling it with the same catalyst as that used in Example 4, and by passing the reaction solution through the reactor at 0.01 ml/min and the mixed gas of hydrogen and oxygen (hydrogen: 20%) through at 11.3 ml/min in terms of the standard state flow rate, followed by applying pressure of 10 atm.

At this time, the pressure difference between G and O in FIG. 2 was about 1.0 atm on both the oxygen and hydrogen sides, and this closely corresponded to the pressure loss between Ak and Bk in FIG. 3. In contrast, the pressure difference between L and O in FIG. 2 of when an equal amount of water only passed through did not reach 0.1 atm. As a result of the reaction, an aqueous hydrogen peroxide having a concentration of 5.0% by weight was obtained under constant conditions.

EXAMPLE 6

Production of hydrogen peroxide was carried out for the same reactor used in Example 4 by filling the fixed bed with a palladium-supported titania catalyst having a mean particle diameter of 60 μm (original product, prepared from titania particles, Covalent Material Corp., and palladium chloride as precursor, followed by hydrazine reduction. Loaded amount of palladium: 1.0% by weight), and by passing the reaction solution through the reactor at 0.04 ml/min and the mixed gas of hydrogen and oxygen (hydrogen: 20%) through at 20 ml/min in terms of the standard state flow rate, followed by applying pressure of 10 atm.

At this time, the pressure difference between G and O in FIG. 2 was about 1.0 atm on both the oxygen and hydrogen sides, and this closely corresponded to the pressure loss between Ak and Bk in FIG. 3. In contrast, the pressure difference between L and O in FIG. 2 of when an equal amount of water only passed through did not reach 0.1 atm. As a result, in contrast to the pressure drop of the gas introduction portion being 0.1 atm, the pressure drop of when the aqueous solution passed through the fixed bed filled with porous silica was less than 0.01 atm. As a result of the reaction, an aqueous hydrogen peroxide having a concentration of 2.7% by weight was obtained under constant conditions, and hydrogen yield was 15.5%.

EXAMPLE 7

A fixed bed reactor having eight parallel channels were fabricated in the present example. The microchannels of the reactor composed of a gas phase introduction portion, liquid phase introduction portion, fixed bed portion and mixed gas/liquid phase discharge portion were fabricated on a Tempax® glass plate measuring 30 mm×70 mm with double side polished by forming grooves therein by chemical etching with hydrofluoric acid.

The grooves were formed into a semi-elliptical shape having a depth of 20 μm and width of 50 μm. Drilling was carried out for the fixed portion, the liquid phase introduction portion and the mixed gas/liquid phase discharge portion on the plate in which microchannel grooves of the reactor were formed by etching.

The shape of the fixed portion had a width of 600 μm and a depth of 900 μm. On the other hand, holes having a diameter of 1 mm were formed by drilling to form a gas phase introduction port, liquid phase introduction port and mixed gas/liquid phase discharge port in a Tempax® glass plate of the same size. Finally, the two Tempax® glass plates were laminated by thermal bonding to produce the fixed bed reactors. The design requirements for the reactor complied with those in Example 4.

Next, the same palladium-supported titania catalyst having a mean particle diameter of 60 μm as that used in Example 6 (original product, loaded amount of palladium: 1.0% by weight) was filled into the fixed beds, and the reaction solution at a flow rate of 0.04 ml/min and a mixed gas of hydrogen and oxygen (hydrogen: 20%) at a flow rate of 40 ml/min in terms of the standard state flow rate were passed through to produce hydrogen peroxide while applying pressure of 10 atm.

At this time, the pressure difference between G and O in FIG. 2 was about 1.0 atm on both the oxygen and hydrogen sides, and this closely corresponded to the pressure loss between Ak and Bk in FIG. 3. In contrast, the pressure difference between L and O in FIG. 2 when an equal amount of water only was passed through did not reach 0.1 atm. As a result, in contrast to the pressure drop of the gas introduction being 0.1 atm, the pressure drop of when the aqueous solution was passed through the fixed bed filled with porous silica did not reach 0.01 atm. As a result of the reaction, an aqueous hydrogen peroxide having a concentration of 5.6% by weight was obtained under constant conditions, and hydrogen yield was 17%.

EXAMPLE 8

Hydrogen peroxide was produced by, in continuation from the reaction of Example 7, passing the reaction solution through at a flow rate of 0.02 ml/min and a mixed gas of hydrogen and oxygen (hydrogen: 20%) through at a flow rate of 40 ml/min in terms of the standard state flow rate while applying pressure of 10 atm. As a result of the reaction, an aqueous hydrogen peroxide having a concentration of 10% by weight was obtained under constant conditions, and hydrogen yield was 18%.

COMPARATIVE EXAMPLE 2

A reactor was fabricated in the same manner as Example 4 with the exception of using a width of 200 μm and depth of 50 μm for the gas phase introduction pipes, and an aqueous solution and mixed gas of hydrogen and oxide were passed through in the same manner as Example 4. As a result, a stable mixed gas/liquid phase flow was unable to be formed and the reaction was unable to proceed. In this reactor, the pressure drop in the gas phase introduction pipes was unable to be ensured, and the conditions of $\Delta P_{g-i} > 10 \Delta P_{g-d}$ and $\Delta P_{g-i} > 5 \Delta P_{l-p}$ of FIGS. 2 and 3 were not satisfied.

COMPARATIVE EXAMPLE 3

A reactor was fabricated in the same manner as Example 4 with the exception of using a width of 600 μm and depth of 50 μm for the liquid phase introduction pipe, and the reaction was evaluated under the same conditions as Example 4. As a result, the liquid was unable to be uniformly distributed and the reaction was again unable to proceed. In this reactor, the pressure drop in the liquid phase introduction pipes was unable to be ensured, and the condition of $\Delta P_{l-i} > 10 \Delta P_{l-d}$ of FIGS. 2 and 3 was not satisfied.

COMPARATIVE EXAMPLE 4

A fixed bed reactor was fabricated in the same manner as Example 4 with the exception of using a width of 600 μm and depth of 300 μm for all of the structures of O in FIG. 2. Although the reactor was attempted to be filled with the catalyst, the pressure drop at the outlet increased, it became difficult to introduce the slurry, and the catalyst was unable to be filled. This reactor did not satisfy the condition of $\Delta P_{l-p} > 2.5 \Delta P_o$ of FIG. 2.

EXAMPLE 9

In the present example, the same reactor as Example 3 was used, and a palladium-supported alumina catalyst (loaded amount of palladium: 5% by weight, N.E. Chemcat Corp.) was filled into the fixed bed portion over a length of 36 mm. Initially hydrogen at 1.5 ml/min, nitrogen at 3.5 ml/min (both in terms of the standard state flow rate) and a reaction solution (having the same composition as that of Example 1) at 0.01 ml/min were supplied, followed by gradually increasing the pressure over the course of one hour to 10 atm, and then carrying out the reaction after switching the introduced gas from nitrogen to oxygen and the results in the table below were obtained.

TABLE 1

| Elapsed time after start of reaction (hr) | Hydrogen peroxide concentration (wt %) | Hydrogen yield (%) |
|---|---|---|
| 0.5 to 2.5 | 1.1 | 3.1 |
| 2.7 to 4.7 | 2.8 | 7.7 |
| 4.9 to 6.9 | 2.6 | 7.4 |

The reaction was stopped after 7 hours had passed from the start of the reaction by switching the oxygen gas to nitrogen gas and reducing the pressure. The following results were obtained after repeating a similar procedure. Catalyst performance was turned to be maintained even between reaction starting and stopping procedures.

TABLE 2

| Elapsed time after start of reaction (hr) | Hydrogen peroxide concentration (wt %) | Hydrogen yield (%) |
|---|---|---|
| 0.5 to 2.5 | 2.8 | 10.1 |
| 2.7 to 4.7 | 2.8 | 10.3 |
| 4.9 to 6.9 | 2.6 | 10.0 |

COMPARATIVE EXAMPLE 5

A fixed bed reactor was produced in the same manner as Example 1 with the exception of using a width of 1 mm and depth of 900 μm for the fixed bed portion (C-D in FIG. 1). The same catalyst as Example 6 was filled into the fixed bed with a length of 40 mm. The same procedure as Example 6 was carried out with the exception of initially introducing hydrogen at 1.0 ml/min and nitrogen at 4.0 ml/min (both in terms of the standard state flow rate) into the reactor, after which a small-scale explosion occurred immediately after switching the introduced gas from nitrogen to oxygen, the wall surface of the microchannels were ruptured and leakage occurred, thereby making it impossible to continue the reaction. This indicates that it is essential in the case of a reactor using microchannels to safely carryout a procedure in which the reaction is started in a reducing atmosphere and then switched to a reactive atmosphere.

COMPARATIVE EXAMPLE 6

In the present comparative example, the same fixed reactor as that of Example 3 was used. The catalyst was filled into the fixed bed portion over a length of 36 mm. The following results were obtained when the reduction and reaction were carried out according to the same procedure as Example 6.

TABLE 3

| Elapsed time after start of reaction (hr) | Hydrogen peroxide concentration (wt %) | Hydrogen yield (%) |
|---|---|---|
| 0.5 to 2.5 | 2.4 | 9.0 |
| 2.7 to 4.7 | 2.8 | 10.5 |
| 4.9 to 6.9 | 2.8 | 10.6 |

The reaction was stopped after 7 hours had elapsed from the start of the reaction by switching the hydrogen gas to nitrogen gas and reducing the pressure. Next, pretreatment was carried out using a gas of the same composition as that used when terminating the reaction, namely using a mixed gas atmosphere of nitrogen and oxygen, and the following results were obtained when the reaction was carried out using the same reaction conditions as Example 6. The decrease in hydrogen peroxide concentration and hydrogen yield indicates that the catalyst had lost the activity as a result of having stopped and started the reaction in an oxidizing atmosphere.

TABLE 4

| Elapsed time after start of reaction (hr) | Hydrogen peroxide concentration (wt %) | Hydrogen yield (%) |
|---|---|---|
| 0.5 to 2.5 | 2.3 | 6.5 |
| 2.7 to 4.7 | 2.4 | 7.0 |
| 4.9 to 6.9 | 2.2 | 6.6 |

Industrial Applicability

As has been described in detail, the present invention relates to a fixed bed reactor for gas/liquid mixed phase and a mixed gas/liquid phase reaction process using the reactor, and the use of the mixed gas/liquid phase reactor composed of the microchannels of the present invention makes it possible to control the flow rate of a mixed gas containing an explosive combination of hydrogen and oxygen and handle the mixed gas safely. As a result of having a fixed bed filled with catalyst in the microchannels, the contact interface between gas and liquid is increased, thereby making it possible to achieve a higher efficiency of mass transfer from gas phase to liquid phase than in a reactor of the prior art. Although the concentration of hydrogen peroxide obtained with a reactor of the prior art was limited to a low value of 0.2% by weight, in the reactor of the present invention, hydrogen peroxide can be obtained at a concentration of, for example, 1.0% by weight, under steady state reaction conditions, mass transfer from gas phase to liquid phase can be promoted at an efficiency 10 to 100 times higher than that with a reactor of the prior art, and when fixed beds are arranged in parallel, gas and liquid are equally distributed to each fixed bed, thereby making it possible to improve productivity without impairing reaction performance. The present invention is useful for providing a novel technology relating to a novel fixed bed mixed gas/liquid phase reactor using microchannels that makes it possible to produce hydrogen peroxide safely and under constant conditions under explosive conditions of a hydrogen content of 20 to 50%.

The invention claimed is:

1. A fixed bed reactor for carrying out a gas/liquid mixed phase reaction, comprising a single fixed bed or multiple fixed beds arranged in parallel said fixed bed or beds being composed of microchannels having a cross-sectional area of 0.0001 cm$^2$ to 0.008 cm$^2$ and having a packing material structure wherein a packing material is filled into the microchannels of the fixed bed or fixed beds,
   a gas phase introduction portion; and
   a liquid phase introduction portion, located upstream of said gas phase introduction portion and an outlet portion for recovering a reaction product; wherein said gas phase introduction portion and said liquid phase introduction portion have a piping structure composed of microchannels, said piping structure having certain cross-sectional area so as to satisfy the condition $\Delta P_g > 5\Delta P_l$ under mixed gas/liquid phase reaction conditions, wherein said packing material structure promotes formation of a mixed gas/liquid phase and is formed so as to satisfy the conditions, $\Delta P_g > 5\Delta P_l$ under mixed gas/liquid phase reaction conditions where $\Delta P_g$ represents the pressure drop of the piping of the gas phase introduction portion when the gas phase has passed therethrough and $\Delta P_l$ represents the pressure drop when the liquid phase has passed through the fixed bed reactor via the liquid phase introduction portion.

2. A fixed bed reactor according to claim 1, wherein said reactor has two or more fixed beds arranged in parallel, and further comprises a gas phase distribution portion, a portion for introducing the gas phase to the fixed bed, a liquid phase distribution portion, a portion for introducing the liquid phase to the fixed bed, a packing material introduction portion, a fluid merging portion, and a packing material structure in which each gas and liquid are evenly distributed in each of the two or more fixed beds arranged in parallel, and when $\Delta P_{g-d}$ and $\Delta P_{g-i}$ represent respectively the pressure drop of the piping of the gas phase distribution portion and the pressure drop of the piping of the gas phase introduction portion, $\Delta P_{l-d}$ and $\Delta P_{l-i}$ represent, respectively, the pressure drop of the piping of the liquid phase distribution portion and the pressure drop of the piping of the liquid phase introduction portion, $\Delta P_{l-p}$ represents the pressure drop of the fixed bed portion of the pressure drops when the liquid phase has passed through the parallely arranged fixed beds, and $\Delta P_o$ represents the pressure loss when the liquid phase has passed through the fluid merging portion following the fixed bed, then all of the conditions 1) to 4) are satisfied:
   1) a ratio of the surface area of the gas phase introduction portion to the surface area of the fixed bed is within a range of 0.0001 to 0.05, and the ratio of the surface area of the liquid phase introduction portion to the surface area of the fixed bed is within a range of 0.0003 to 0.3;
   2) $\Delta P_{l-i} > 10\Delta P_{l-d}$ and $\Delta P_{g-i} > 10\Delta P_{g-d}$;
   3) $\Delta P_{l-p} > 2.5\Delta P_o$; and
   4) $\Delta P_{g-i} > 5\Delta P_{l-p}$.

3. The fixed bed reactor according to claim 1, wherein the ratio of the cross-sectional area of the gas phase introduction portion to the cross-sectional area of the fixed bed is within the range of 0.0002 to 0.02.

4. The fixed bed reactor according to claim 1, wherein the ratio of the cross-sectional area of the liquid phase introduction portion to the cross-sectional area of the fixed bed is within the range of 0.001 to 0.1.

5. The fixed bed reactor according to claim 1, wherein the ratio of the cross-sectional area of the piping of the gas phase introduction portion to the cross-sectional area of the piping of the liquid phase introduction portion is 1 or less.

6. The fixed bed reactor according to claim 1, wherein the cross-sectional area of the fixed bed is 0.0008 $cm^2$ to 0.008 $cm^2$.

7. The fixed bed reactor according to claim 1, wherein the packing material is a catalyst.

8. The fixed bed reactor according to claim 7, wherein said catalyst contains elements of palladium, gold and/or platinum.

9. The fixed bed reactor according to claim 2, wherein the ratio of the cross-sectional area of the gas phase introduction portion to the cross-sectional area of the fixed bed is within a range of 0.0002 to 0.02.

10. The fixed bed reactor according to claim 2, wherein the ratio of the cross-sectional area of the liquid phase introduction portion to the cross-sectional area of the fixed bed is within a range of 0.001 to 0.1.

11. The fixed bed reactor according to claim 2, wherein the ratio of the cross-sectional area of the piping of the gas phase introduction portion to the cross-sectional area of the piping of the liquid phase introduction portion is 1 or less.

12. The fixed reactor according to claim 2, wherein the cross-sectional area of the fixed bed is 0.0008 $cm^2$ to 0.008 $cm^2$.

13. The fixed bed reactor according to claim 2, wherein a packing material is a catalyst.

14. The fixed bed reactor according to claim 2, wherein a catalyst filled into the fixed bed contains elements of palladium, gold and/or platinum.

15. A process for carrying out a mixed gas/liquid phase reaction using the fixed bed reactor defined in claim 1, wherein a mixed gas/liquid phase reaction is carried out by operating the fixed bed reactor under conditions such that the superficial velocity of the gas phase is 0.01 m/s to 10 m/s and the superficial velocity of the liquid phase is $10^{-5}$ m/s to $10^{-2}$ m/s in the single fixed bed or in each parallely arranged fixed bed.

16. The reaction process according to claim 15, wherein when directly synthesizing hydrogen peroxide from hydrogen and oxygen, the reaction process is started in a reducing atmosphere, the reaction for directly synthesizing hydrogen peroxide is next carried out in the presence of hydrogen and oxygen, and finally the reaction is terminated in a reducing atmosphere.

17. The reaction process according to claim 16, wherein a suitable amount of hydrogen gas or a mixed gas of hydrogen and nitrogen is passed through the microchannels of the fixed beds, said microchannels having been filled with a catalyst containing a palladium and/or other metal, and the reaction is started after sufficiently creating a reducing atmosphere on the catalyst surface and in said microchannels.

18. The reaction process according to claim 16, wherein when terminating the reaction, a suitable amount of hydrogen gas or a mixed gas of hydrogen and nitrogen is passed through the microchannels of the fixed beds after the synthesis reaction has completely ended, said microchannels havin been filled with a catalyst containing palladium and/or other metal, and the reaction is stopped after creating a reducing atmosphere on the catalyst surface and in said microchannels.

19. The reaction process according to claim 15, wherein the gas phase contains oxygen and/or hydrogen.

20. The reaction process according to claim 15, wherein the liquid phase has as a main component water and/or an organic compound containing a hydroxyl group.

21. The reaction process according to claim 20, wherein the main component of the liquid phase is water and/or alcohol.

22. A process for carrying out a mixed gas/liquid phase reaction using the fixed bed reactor defined in claim 2, wherein a mixed gas/liquid phase reaction is carried out by operating the fixed bed reactor under conditions such that a linear velocity of the gas phase is 0.01 m/s to 10 m/s and a linear velocity of the liquid phase is $10^{-5}$ m/s to $10^{-2}$ m/s in a single microchannel or parallely arranged microchannels.

23. The gas/liquid mixed phase reaction process according to claim 22, wherein when directly synthesizing hydrogen peroxide from hydrogen and oxygen, the reaction process is started in a reducing atmosphere, the reaction for directly synthesizing hydrogen peroxide is next carried out in the presence of hydrogen and oxygen, and finally the reaction is terminated in a reducing atmosphere.

24. The reaction process according to claim 23, wherein after filling a catalyst containing palladium and/or other metal into microchannels, a suitable amount of hydrogen gas or a mixed gas of hydrogen and nitrogen is passed through the microchannels, and the reaction is started after sufficiently creating a reducing atmosphere on the catalyst surface and in the microchannels.

25. The reaction process according to claim 23, wherein when terminating the reaction, a suitable amount of hydrogen gas or a mixed gas of hydrogen and nitrogen is passed through the microchannels after the synthesis reaction has completely ended, and the reaction is stopped after sufficiently creating a reducing atmosphere on the catalyst surface and in the microchannels.

26. The reaction process according to claim 22, wherein the gas phase contains oxygen and/or hydrogen.

27. The reaction process according to claim 22, wherein the liquid phase has as a main component water and/or an organic compound containing a hydroxyl group.

28. The reaction process according to claim 27, wherein the main component of the liquid phase is water and/or alcohol.

* * * * *